United States Patent
Shouji et al.

[11] Patent Number: 5,880,910
[45] Date of Patent: Mar. 9, 1999

[54] MAGNETO-RESISTIVE READING HEAD WITH TWO SLANTED LONGITUDINAL BIAS FILMS AND TWO SLANTED LEADS

[75] Inventors: Shigeru Shouji; Atsushi Toyoda, both of Hamamatsu, Japan

[73] Assignee: Yamaha Corporation, Japan

[21] Appl. No.: 821,270

[22] Filed: Mar. 20, 1997

Related U.S. Application Data

[63] Continuation-in-part of Ser. No. 580,296, Dec. 28, 1995, abandoned.

[30] Foreign Application Priority Data

Dec. 29, 1994 [JP] Japan .............................. HEI 6-340504

[51] Int. Cl.[6] ....................................................... G11B 5/39
[52] U.S. Cl. ................................................................ 360/113
[58] Field of Search ..................................... 360/110, 113, 360/126; 324/252; 338/32 R

[56] References Cited

U.S. PATENT DOCUMENTS

| | | | |
|---|---|---|---|
| 5,491,600 | 2/1996 | Chen et al. | 360/113 |
| 5,573,809 | 11/1996 | Nix et al. | 427/123 |
| 5,664,316 | 9/1997 | Chen et al. | 29/603.08 |
| 5,668,686 | 9/1997 | Shouji et al. | 360/113 |
| 5,691,864 | 11/1997 | Saito | 360/113 |
| 5,722,157 | 3/1998 | Shouji et al. | 360/113 X |

*Primary Examiner*—William R. Korzuch
*Attorney, Agent, or Firm*—Ostrolenk, Faber, Gerb & Soffen, LLP

[57] ABSTRACT

On a lower magnetic shield film, a lower gap film is formed on which a conductive lead film and a magnet film is laminated. The magnet film forms a bias permanent magnet film for generating a single magnetic domain of a magneto-resistance film. This lead film is trenched to the lower gap layer (20) to form a trapezoid trench and separated leads. A sensor unit having the magneto-resistance film is formed conformally to the trench and electrically connected to the separated leads. An upper gap is formed on the sensor unit (28), and an upper shield is formed on the upper gap.

9 Claims, 33 Drawing Sheets

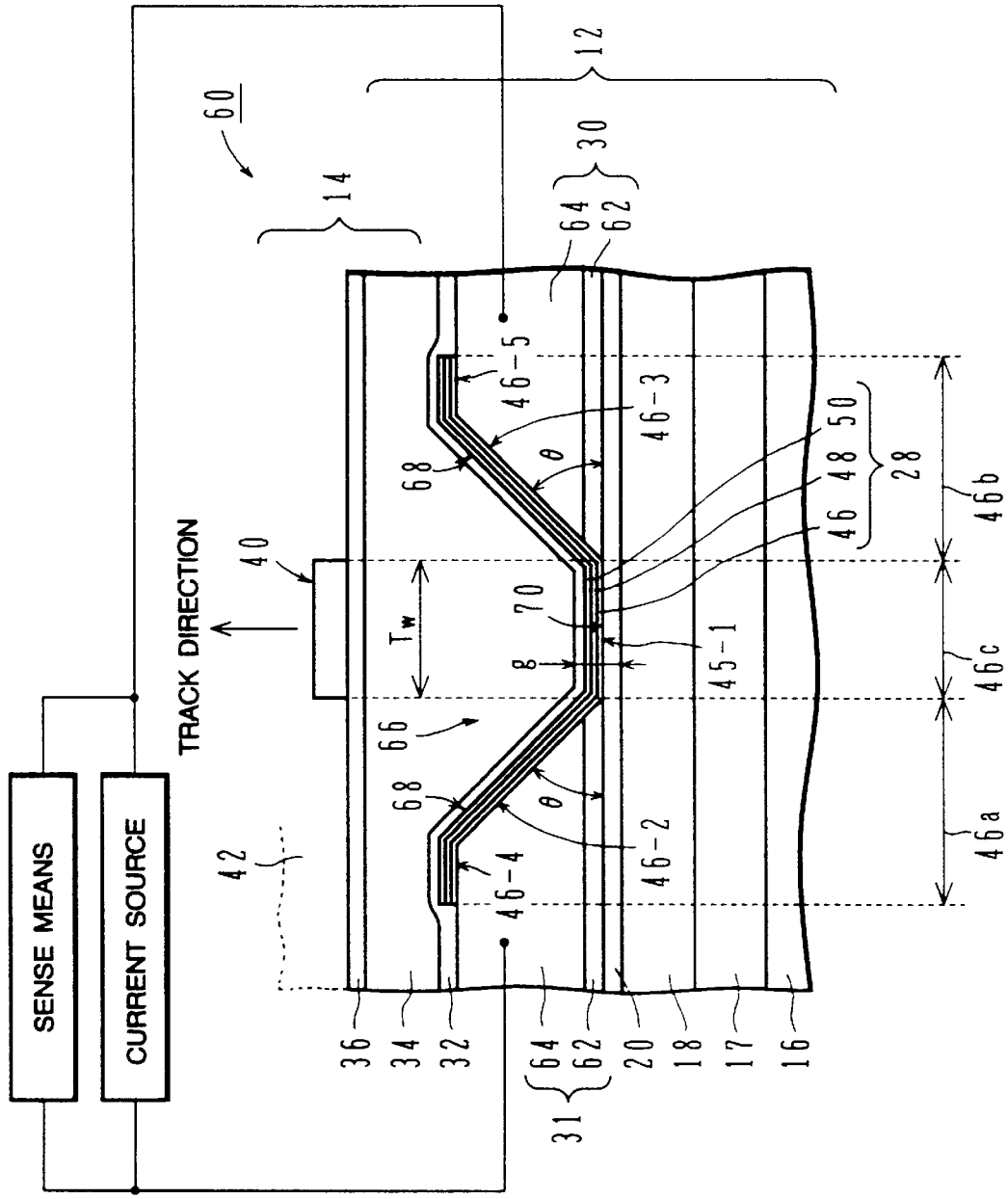

MILLING PARTICLES

MILLING PARTICLES

TRACK WIDTH

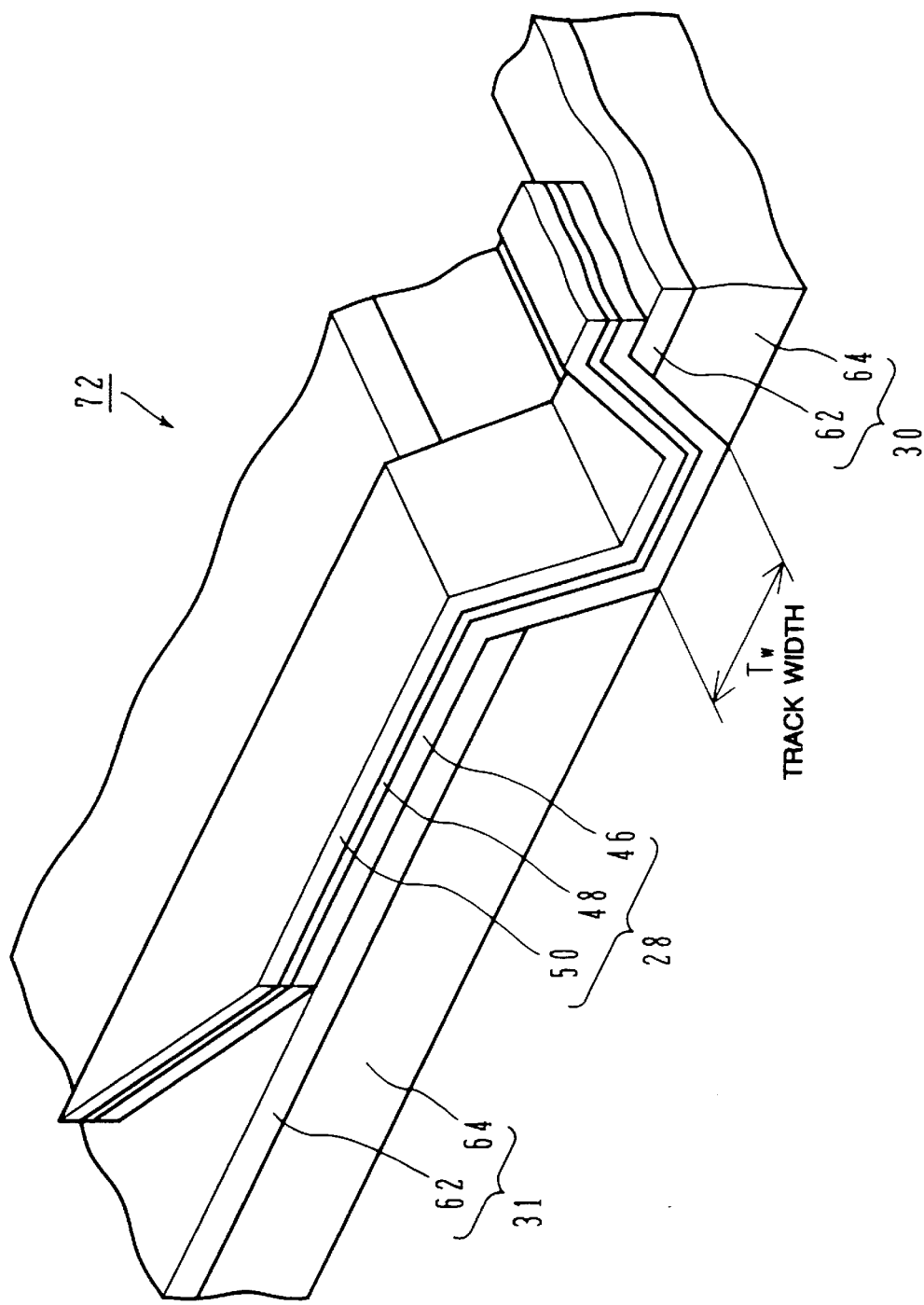

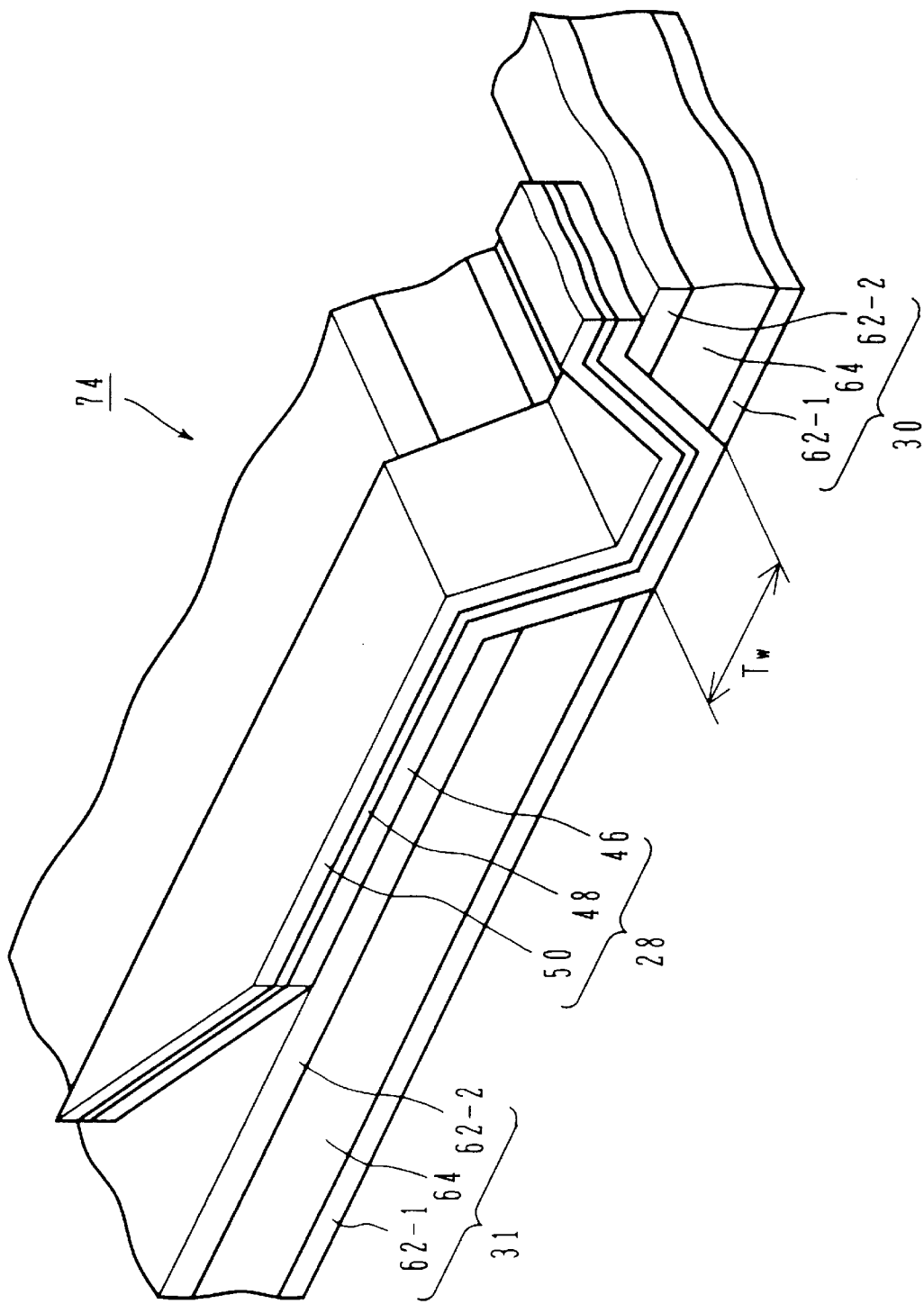

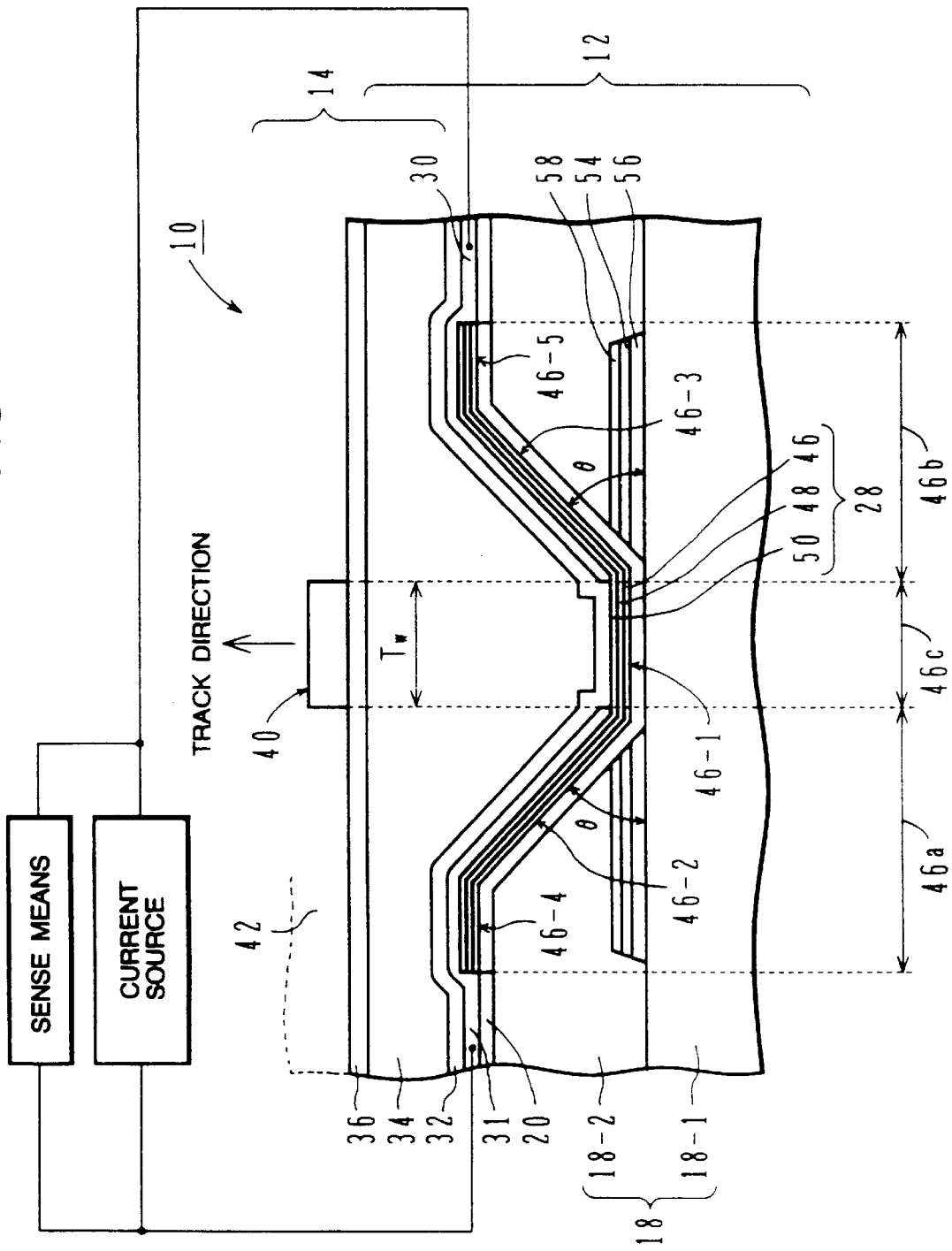

5,880,910

MAGNETO-RESISTIVE READING HEAD WITH TWO SLANTED LONGITUDINAL BIAS FILMS AND TWO SLANTED LEADS

CROSS REFERENCE TO RELATED APPLICATION

This application is a continuation-in-part application of U.S. Pat. application Ser. No. 08/580,296 filed on Dec. 28, 1995, the entire disclosure of which is incorporated by reference herein.

BACKGROUND OF THE INVENTION a) Field of the Invention

The present invention relates to a magneto-resistance (MR) reading head used for hard disks or the like, adn more particularly to an MR reading head capable of reading data recorded on a narrow track at a high density, by suppressing the generation of a side-lobe which shows an off-track characteristic specific to an MR element, while preventing a sensitivity from being lowered.

b) Description of the Related Art

An MR head is a magnetic head dedicated to reproducing (reading) information recorded on a magnetic recording medium with an MR element by detecting a magnetic field generated from storage magnetic poles in the recording medium. As compared to an induction type magnetic head, an MR head has an advantage in improving a track density and a linear density of recording. Therefore, an induction-MR type composite magnetic head for hard disks is made of a combination of an MR head and, for example, a recording (writing) induction type head.

A conventional induction-MR type composite magnetic head for hard disks is shown in FIGS. 8A and 8B. FIG. 8A is a cross sectional view showing the side elevation of the composite magnetic head, and FIG. 8B is a perspective view thereof as seen from the recording medium plane side. The induction-MR type composite magnetic head 10 is constituted by a lamination of an MR type magnetic head (MR head) 12 and an induction type magnetic head 14 both being formed on a rear end portion of a substrate 16 having a slider surface 24. Both the heads 12 and 14 are manufactured by adopting thin film forming technique.

A lower shield layer 18 of the MR type magnetic head 12 is formed on the slider substrate 16 at its read end portion. The rear end portion of the slider substrate 16 is flat and the lower shield layer 18 is of a flat sheet structure. A lower gap layer 20 of non-magnetic material is laminated upon the lower shield layer 18. A sensor unit 28 is formed on the lower gap layer 20 with its end surface being directed toward a counter surface (slider surface) 24 of a recording medium. The sensor unit 28 is made of an MR film 46, a magnetic spacer layer 48, and a soft adjacent layer (SAL) 50 deposited in this order on the lower gap layer 20 and made flat. As shown in FIG. 8B, on the opposite end portions of the sensor unit 28, leads (lead conductors) 30 and 31 are laminated to establish electrical contacts to the sensor unit. The region of the MR film 46 not overlapped with the leads 30 and 31 is an active region whose resistance is changed by a magnetic field. The region of the MR film 46 overlapped with the leads 30 and 31 is an inactive region whose resistance change cannot be detected because of the high conductivity leads 30 and 31. An upper gap layer 32 of insulating material such as alumina is formed on the sensor unit 28 and leads 30 and 31. An upper shield layer 34 is formed on the upper gap layer 32. The lower and upper shield layers 18 and 34 are formed by depositing soft magnetic material having a high permeability through sputtering, vapor deposition, plating, or the like.

The induction type magnetic head 14 uses the upper shield layer 34 of the MR type magnetic head 12 as its lower core. Sequentially deposited on the upper shield layer 34 are a gap layer 36, a coil 37 buried in an insulating layer 38, an upper core 40, and a protection film 42. The gap layer 36 separates the upper and lower cores 40 and 34 at the lower end as shown in FIG. 7A to form a magnetic gap.

In recording data with the induction-MR type composite magnetic head 10 shown in FIGS. 8A and 8B, a recording current is flowed through the coil 37 of the induction type magnetic head 14 to generate a recording (leakage) magnetic field in the magnetic gap between the upper and lower cores 40 and 34 and record data in a recording medium by this magnetic field. In reproducing data, a predetermined current is flowed through the MR film 46 via the leads 30 and 31 of the MR type magnetic head 12 to magnetically saturate the SAL film 50 and apply a transverse bias magnetic field to the MR film 46 by this saturated magnetic field. A current flowing through the MR film 46 via the leads 30 and 31 is a sense current by which a voltage drop in the MR film 46 generated by a change in an applied magnetic field is detected. As the head 12 traces a track of the recording medium, a voltage across the MR film 46 is modulated by magnetization information on the track so that the recorded data can be detected.

The off-track characteristic of a magnetic head will be explained. FIG. 9A illustrates a read/write operation by a general induction type magnetic head. In a write operation, a signal is written on a track of a recording medium (hard disk) in a pole width Tw of the poles of the upper and lower cores 40 and 34. This written magnetization information is read by the induction type magnetic head. In this case, a maximum reproduction sensitivity is obtained when the poles reach the position just above the track width Tw. As the poles shift in a direction (track width direction) perpendicular to the motion direction of the recording medium, the reproduced output lowers in correspondence with a shift amount of the poles from the track width Tw. FIG. 9B illustrates the off-track characteristic $O_I$. The abscissa represents a lateral shift from the track center, and the ordinate represents a reproduced output voltage in an absolute value. As shown in FIG. 9A, the lateral right shift of the poles is represented by a plus (+) sign, and the lateral left shift is represented by a minus (−) sign.

The off-track characteristic $O_I$ of a general induction type magnetic head shows a maximum sensitivity Vmax when the center of a track width of magnetization information written on a recording medium becomes coincident with the center of the pole width Tw. The reproduction sensitivity Vmax gradually lowers symmetrically with the right and left shifts of the poles, as the poles shift in the track width direction. A reproduction output of the induction magnetic head depends on a speed of the recording medium relative to the head, and is zero when the relative speed is zero.

For reproduction with the MR-induction type composite magnetic head, the MR type magnetic head is used. Since the MR type magnetic head detects a change in magnetic flux density as a change in resistance, it can detect magnetization information independently from a relative speed between the head and magnetic recording medium. FIG. 10 shows an example of the off-track characteristic of an MR type magnetic head. As shown, the off-track characteristic $O_{MR}$ is asymmetric with the track center and has a small bump called a side-lobe. The reason why this side-lobe is formed will be described with reference to FIGS. 11A to 11EA.

FIGS. 11A to 11E show relative positions of a track 52 written on a recording medium and a MR type magnetic head such as shown in FIGS. 8A and 8B. FIGS. 11AA to 11EA illustrate mechanisms of generating reproduction outputs by the MR type magnetic head at corresponding positions shown in FIGS. 11A to 11E. The relative positions of FIGS. 11A to 11E are shown as cross sections perpendicular to a plane of a recording medium.

An MR film 46 has an easy axis of magnetization in a horizontal direction or longitudinal direction as seen in FIGS. 11A to 11E. Of the MR film 46, the regions (inactive regions) overlapped with the leads 30 and 31 are called lead regions 46a and 46b, and the region between these lead regions is called an active region 46c. As magnetization in the active region 46c changes, a reproduction output changes. The width of the active region 46c is equal to the width of a track 52. It is assumed here that a sense current i flows through the MR film 46 from left to right and a magnetic field is generated upward in the MR film 46. It is also assumed that a magnetization vector of the track is upward.

Current flows through the MR film 46 to magnetically saturate the SAL bias film 50 (FIG. 8B) and this saturated magnetic field applies an upward bias magnetic field to the active region 46c. In order to obtain a maximum sensitivity, the magnetization direction is set about 45 degrees relative to the plane of a magnetic recording medium. Solid lines in the MR film 46 indicate magnetization in the MR film 46 without external magnetization, and broken lines indicate magnetization rotation in the MR film 46 caused by a magnetic field from the track 52.

In FIGS. 11AA to 11EA, a magnetization vector in the MR active region generated by a static bias is indicated by M1, a magnetization vector generated during a reproduction operation is indicated by M2, and the resultant vector is indicated by M3. Namely, the magnetization vector changes from M1 to M3 during the reproduction operation.

The plus (+) sign in the abscissa in FIG. 10 corresponds to a track left shift relative to the active region 46c, and the minus (−) sign corresponds to a track right shift. FIGS. 11A to 11E stand for two minus values, 0, and two plus values.

As shown in FIG. 11A, when the track 52 is at the minus position and under the lead region 46a, magnetization of the lead region 46a is influenced by a magnetic field of the track 52. Therefore, magnetization in the active region 46c receives a clockwise vector as shown in FIG. 11AA. The influence of this clockwise vector becomes larger, the higher the uniaxial anisotropy of the MR film 46.

As shown in FIG. 11B, when the track 52 moves right and rides over the lead region 46a and active region 46c, the magnetic field of the track 52 directly influences the magnetization of the active region 46c and further gives a clockwise vector to the active region 46c as shown in FIG. 11BA. Therefore, a reproduction output further increases.

As shown in FIG. 11C, as the track 52 further moves right to the position coincident with the active region 46c, the direct influence of the track 52 upon the active region 46c becomes maximum. At this time, the influence of the clockwise magnetization vector is strongest and the output is maximum.

As shown in FIG. 11D, as the track 52 further moves right from the track center and rides over the active region 46c and lead region 46b, the magnetic field of the track 52 influences the lead region 46b to rotate the magnetization of the active region in a counter-clockwise direction. Therefore, as shown in FIG. 11DA, the function of clockwise rotation of the magnetization in the active region is cancelled and the reproduction output rapidly lowers. The reproduction output becomes zero when the clockwise magnetization vector in the active region 46c directly influenced by the magnetic field of the track 52 balances just with the counter-clockwise magnetization vector in the active region 46c influenced by the magnetization in the lead region 46b caused by the magnetic field of the track 52.

As shown in FIG. 11E, as the track 52 further moves right and reaches under the right lead region 46c, The magnetic field of the track 52 influences the magnetization in the lead region 46b, and the magnetization in the active region 46c is rotated in the counter-clockwise direction. Therefore, as shown in FIG. 11EA, the magnetization vector is rotated in the counter-clockwise direction and a reproduction output of an opposite phase is generated. This opposite phase output gradually reduces as the track 52 further moves right away from the lead region 46b.

From the above reason, the off-track characteristic becomes asymmetrical as shown in FIG. 10. The narrower the width (track width) of the active region 46c is set, the larger the side lobe SL. If the direction of current is reversed, this relation is also inverted and the side-lobe SL appears on the left side. Such a side-lobe becomes a vital obstacle against a reliable tracking servo and makes it impossible to perform a servo control of a narrow track. High density recording is therefore hindered.

As a method of reducing a side-lobe, it can be considered that magnetization (in the same direction of an anisotropic magnetic field in the MR film 46) of uniaxial anisotropy bias magnet films on the right and left sides of the MR film 46 is made stronger. However, in this case, in order to maintain the direction of magnetization in the MR film 46 at 45°, a bias magnetic field of the SAL bias film 50 is required to be made stronger. Therefore, a change in the direction of magnetization in the MR film 46 with the magnetic field from a recording medium becomes small and the reproduction sensitivity lowers. This is conspicuous particularly for narrow tracks.

There is proposed a method of manufacturing magnetic head utilizing a tapered surface.

On a flat non-magnetic substrate, a tri-layer which comprises a longitudinal bias layer, a non-magnetic spacer layer, and a magnetoresistive layer, is formed. A resist film is coated on the tri-layer and patterned. Here, the cross sectional shape of the resist pattern is arranged to have a lower hollow or recess. The tri-layer is subjected to ion milling using the resist pattern as a mask, while changing the angle of the substrate relative to the ion beam in the ion milling chamber. The ion milling may be performed using $Ar^+$ ions. The cross section of the resulting tri-layer diverges downwardly. Namely, the cross section has a trapezoital shape.

A hard magnetic bias layer and an electrode layer are laminated on the tri-layer using the resist pattern as a mask. The hard magnetic bias layer abuts against the tapered side surface of the magnetoresistive layer. Then, the substrate is immersed in chemical agent to remove the resist pattern. Here, the hard magnetic bias layer and the electrode layer deposited on the resist pattern are also removed (i.e. lifted off).

SUMMARY OF THE INVENTION

It is an object of the present invention to provide an MR head suitable for high density recording and reproducing data to and from a narrow track and capable of improving the off-track characteristic of an MR element while preventing the sensitivity from being lowered.

According to one aspect of the present invention, there is provided a magneto-resistance type head comprising: (a) a base; (b) a magnetic shield layer formed on the base; (c) a pair of conductive lead members formed over the magnetic shield layer with a gap therebetween, each having a flat surface portion and a slanted surface potion provided between the flat surface portion and the gap so as to define a recess; and (d) a magneto-resistance material layer conformally formed over and bridging the conductive lead members.

An MR head can be manufactured in a self-alignment manner while defining the active region by connecting electrodes to the MR film and while lowering an unnecessary sensitivity of the slanted regions of the MR film.

An MR head having an excellent characteristic with a simple structure can be manufactured by simplified processes.

According to another aspect of the present invention, there is provided a composite magnetic head comprising: (A) a base; (B) a magneto-resistance type head comprising: (a) a first magnetic shield layer formed on the base; (b) a pair of conductive lead members formed over the first magnetic shield layer with a gap therebetween, each having a flat surface portion and a slanted surface potion provided between the flat surface portion and the gap so as to define a recess; and (c) a magneto-resistance material layer conformally formed over and bridging the conductive lead members, (C) an inductive type magnetic head comprising: (c-1) a second magnetic shield layer formed on the magneto-resistance type head; (c-2) a first magnetic gap layer formed on the second magnetic shield layer; (c-3) a third magnetic layer formed over the first magnetic gap layer; and (c-4) a plurality of conductive coils formed between the third magnetic layer and the first gap layer.

The inventors have proposed an induction-MR type composite magnetic head capable of high density data recording and reproducing to and from narrow tracks by improving the off-track characteristic of an MR read head (Japanese Patent Application No.6-340503 which corresponds to U.S. Pat. application Ser. No. 08/579,928, filed on Dec. 28, 1995 and assigned to the same assignee, which is herein incorporated by reference). The MR film has a linear region formed generally in a straight line shape as viewed from the recording medium counter plane side, and slanted regions formed on both sides of the linear region and inclined from the linear region. The sensitivity of the slanted regions is very small as compared to the linear region so that noises to be generated when the head shifts from the track are reduced. Therefore, asymmetry of the off-track characteristic of the MR head can be improved considerably, and a side-lobe can be reduced greatly.

According to further aspect of the present invention, there is provided a method of manufacturing a thin film magnetic head comprising the steps of: (a) providing a base; (b) forming a longitudinal bias layer on the base for generating a longitudinal bias magnetic field; (c) laminating a lead layer directly on the longitudinal bias layer, the lead layer being made of non-magnetic material; (d) forming a resist pattern, having an aperture, on the lead layer; (e) selectively removing the lead layer and the longitudinal bias layer through the aperture of the resist pattern to form a hole laterally separating the lead layer and the longitudinal bias layer so as to form first and second longitudinal bias films and first and second leads, wherein the first and second longitudinal bias films and first and second leads having slanted surfaces; (f) removing the resist pattern; and (g) conformally forming a magneto-resistance material layer over the first and second longitudinal bias films and the first and second leads so as to magnetically couple with the longitudinal bias films only through the slanted surfaces of the longitudinal bias films.

BRIEF DESCRIPTION OF THE DRAWINGS

FIGS. 1A and 1B show an induction-MR type composite magnetic head for hard disks according to an embodiment of the invention, FIG. 1A is a perspective view of the magnetic head as seen from the recording medium counter plane side, and FIG. 1B is a front view of the magnetic head.

FIGS. 2A to 2L are cross sectional views illustrating the processes of manufacturing the induction-MR type composite magnetic head shown in FIGS. 1A and 1B.

FIG. 4 is a perspective view showing the main part of an induction-MR type composite magnetic head for hard disks according to another embodiment of the invention.

FIG. 6 is a perspective view showing the main part of an induction-MR type composite magnetic head for hard disks according to another embodiment of the invention.

FIG. 12B is a cross sectional view of the composite magnetic head as viewed from the recording medium counter plane side.

FIG. 14A is a graph showing the relationship between an azimuth angle and a reproduction output, and FIG. 14B is a graph showing the off-track characteristic.

FIGS. 15A to 15E illustrate another embodiment of this invention, wherein FIGS. 15A to 15D are cross sections of a magnetic head, and FIG. 15E is a graph showing the distribution of the longitudinal magnetic field strength.

DETAILED DESCRIPTION OF THE PREFERRED EMBODIMENTS

In order to help understand the present invention, the U.S. Pat. application Ser. No. 08/579,928 entitled "MAGNETO-RESISTIVE HEAD WITH REDUCED SIDE-LOBE" filed by the present inventors on the same day and assigned to the same assignee, now U.S. Pat. No. 5,668,686 which is herein incorporated by reference, will first be described.

In this application, the following conditions or definitions are adopted.

(1) A transverse bias field is applied so as to bias a magneto-resistance (MR) material so that its response to a magnetic flux field is linear. The transverse bias field is generally normal to the plane of the magnetic media and parallel to the surface of a planar MR element. The transverse bias field is provided by a current flow through a layer of soft magnetic material formed adjacent to the MR element and separated by a thin electrically insulating layer.

(2) A longitudinal bias field is applied so as to make magnetic domain of the MR material single so that Barkhausen noise caused by multi-domain activities in the MR material is suppressed. The longitudinal bias field extends parallel to the surface of the magnetic media and parallel to the lengthwise direction of the MR element. The longitudinal direction is provided by hard magnet or exchange coupling bias.

Figure 12A:
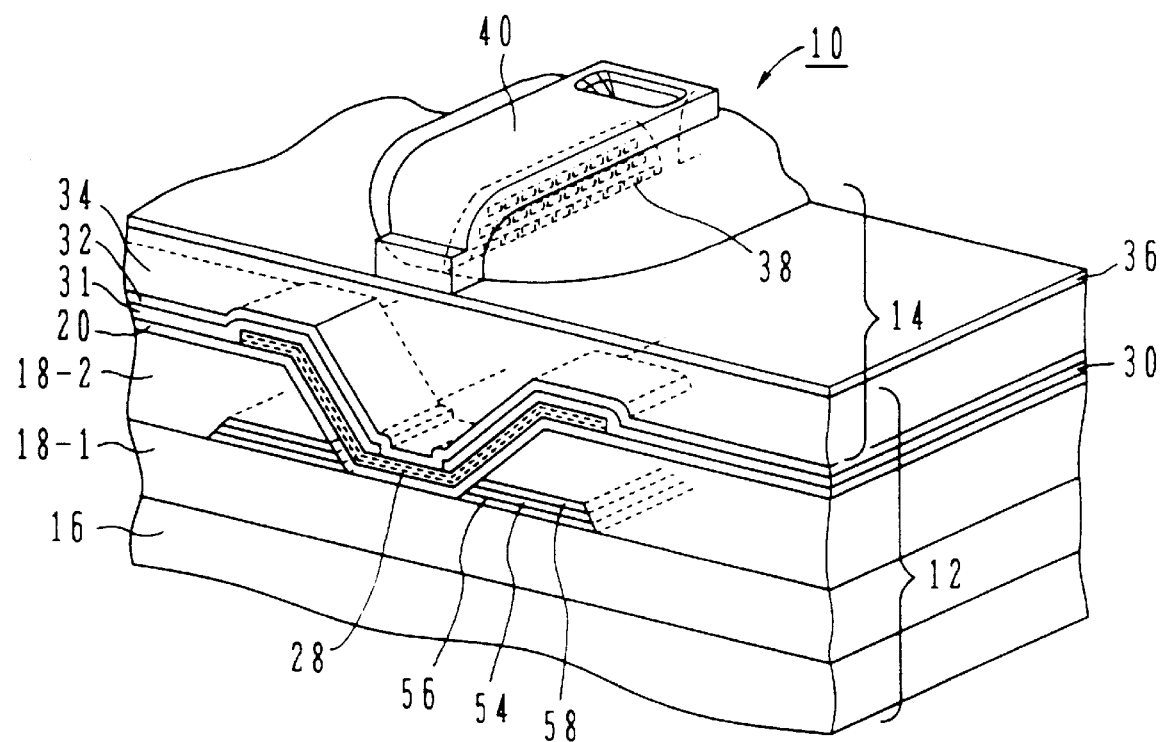
FIG. 12A is a perspective view of an induction-MR type composite magnetic head for hard disks proposed by the inventors.

FIGS. 12A and 12B are a perspective view and a front vies of an induction—magnetoresistive (MR) type composite magnetic head.

In FIGS. 12A and 12B, the magneto-resistance (MR) head is combined with an induction type magnetic head to form an induction-MR type composite magnetic head for hard disks. FIG. 12A is a perspective view of the composite magnetic head as seen from a recording medium counter plane side, and FIG. 12B is a front view of the magnetic head. The induction-MR type composite magnetic head 10 is formed by a laminate of an MR type magnetic head (MR head) 12 and an induction type magnetic head 14 stacked in this order on a ceramic slider substrate 16 of $Al_2O_3$-TiC at its rear end portion. Both the heads 12 and 14 are formed by adopting thin film forming technique.

In the MR type magnetic head 12, a lower shield layer 18 is formed on the slider substrate 16 at its rear end portion, the lower shield layer 18 being a laminate of two lower shield sub-layers 18-1 and 18-2 of soft magnetic material such as permalloy (NiFe) and Sendust. Of the two lower shield sub-layers, the upper side lower shield sub-layer 18-2 is trenched to have an inverted trapezoid cross section. On the lower shield layer 18, a lower gap layer 20 of insulating material is deposited conformal to the inverted trapezoid shape. On this lower gap layer 20, a sensor unit 28 is formed which is a laminate of an MR film (MR element) 46 such as NiFe, a magnetic spacer layer 48 such as Ti, and an SAL bias film 50 of CoZrM (M is Nb, Mo, etc). The MR film 46 has a bottom flat region 46-1, opposite slanted regions 46-2 and 46-3, and outside upper flat regions 46-4 and 46-5, respectively in conformity with underlying topology. The slanted regions 46-2 and 46-3 are contiguous with the bottom flat region 46-1 and outside upper flat regions 46-4 and 46-5. The MR film 46 has a gull-wing shape as seen from the front of a magnetic recording medium. The bottom flat region is disposed generally parallel to a magnetization transition boundary line of a signal recorded on a track during a reproduction operation (in other words, generally parallel to a write gap 36), and has a generally linear cross section. Therefore, the bottom flat region is hereinafter called a linear region 46-1. The opposite slanted regions are inclined at the opposite sides of the linear region 46-1 by an angle θ relative to a line extended from the linear region 46-1 (i.e., relative to a magnetization transition boundary line of a signal recorded on a track). Therefore, the opposite slanted regions are hereinafter called slanted regions 46-2 and 46-3. The opposite upper flat regions are formed on the top surface of the lower shield layer 18 outward of the slanted regions, and called hereinafter outer peripheral regions 46-4 and 46-5. Although the spacer layer 48 and SAL bias layer 50 have the structure similar to the MR film 46, the following description is directed mainly to the MR film 46 because the essential element is the MR film 46.

The angle θ of the slanted regions 46-2 and 46-3 relative to a line extended from the linear region is preferably about $20° < θ < $ about $75°$.

A larger angle θ gives a larger azimuth effect to be described layer. However, if the angle θ is too large, the film thickness of the sensor unit 28 formed by sputtering or the like becomes thin at the slanted region 46-2 (46-3). Furthermore, a crevasse is likely to be formed in the sensor unit 28 at a boundary area (bent area) between the slanted regions 46-2 and 46-3 and linear region 46-1, and an electrical conduction is lost at the worst. Therefore, in order to deposit the sensor unit 28 uniformly and avoid such a crevasse, the upper limit of the angle θ is preferably about 75°.

On the other hand, if the angle 0 is too small, the boundary between the slanted regions 46-2 and 46-3 and linear region 46-1 becomes vague, and the azimuth effect is lowered. The lower limit of the angle 0 is therefore preferably about 20°.

A fixed bias permanent magnet (uniaxial anisotropy bias magnet film) 54 for generating a longitudinal bias field so that a single magnetic domain is formed between the two lower shield sub-layers 18-1 and 18-2. The permanent magnet 54 is sandwiched between magnetic spacer layers 56 and 58, and deposited on both sides of the linear region 46-1 of the MR film 46, being generally flush with the plane of the linear region 46-1. This bias permanent magnet 54 for generating a single magnetic domain suppresses the shape or form anisotropy effect generated at the bent portion (boundary portion) between the linear region 46-1 and slanted regions 46-2 and 46-3 of the MR film 46, and improves the uniaxial anisotropy of the MR film 46. The bias permanent magnet 54 for generating a single magnetic domain is magnetized in a direction parallel to the track width of the MR film 46 (in the easy axis direction of magnetization of the MR film 46). The slanted regions 46-2 and 46-3 of the MR film 46 extend in the track width direction over the fixed bias magnet 54.

On the sensor unit 28, leads 30 and 31 are formed extending from the opposite end portions of the linear region 46-1 slightly before the slanted regions 46-2 and 46-3 (therefore, the leads 30 and 31 are laid on the boundary between the linear region 46-1 and the slanted regions 46-2 and 46-3), over the slanted regions 46-2 and 46-3 and outer peripheral regions 46-4 and 46-5. Of the MR film 46, the linear region (more precisely, the partial region of the linear region between the leads 30 and 31) 36-1 forms the active region 46c, and the slanted regions 46-2 and 46-3 and outer peripheral regions 46-4 and 46-5 formed with the leads forms lead regions 46a and 46b (inactive regions).

The reason of forming the leads not only on the slanted regions 46-2 and 46-3 but also slightly on the linear region 46-1 is as follows. In forming lead films 30 and 31 on the sensor unit 28, a negative resist layer 45 is deposited, exposed via a mask 47, and developed. Resist 45' exposed with exposure light is left. A lead material film is deposited to form the leads 30 and 31 through lift-off. If the resist layer 45 is patterned at the slanted regions 46-2 and 46-3 or at the boundary area between the linear region 46-1 and slanted regions 46-2 and 46-3, it is difficult to form a vertical side wall of the resist layer 45 because of unexpected light reflected from the slanted regions 46-2 and 46-3. It is therefore difficult to define the track width with high precision. The effect of light reflected from the slanted regions becomes large if positive resist is used. Even if a lead layer is deposited and thereafter a resist mask is formed to etch the lead layer, the pattern precision is also likely to be lowered because of the slanted regions.

If the resist layer 45 is patterned at the linear region 46-1 away from the slanted regions 46-2 and 46-3, the effect of light reflected from the slanted regions can be reduced. Therefore, the position of the resist side wall can be controlled precisely and the track width is defined with high precision. It is not preferable to give any reproduction sensitivity at the slanted regions 46-2 and 46-3, because noises generated by detecting an unnecessary signal may superpose on an original signal. It is preferable to give a reproduction sensitivity of an original signal only to the linear region. If the leads 30 and 31 are formed slightly on the linear region 46-1, the adverse effect by the slanted regions 46-2 and 46-3 can be reduced. From the above reason, in the embodiment shown in FIGS. 12A and 12B, the width (Tw) of the active region 46c is set a little narrower than the whole width of the linear region 46-1.

On the sensor unit 28 and leads 30 and 31, an upper gap layer 32 of insulating material such as alumina is formed. On the upper gap layer 32, an upper shield layer 34 of the same materials as the lower shield layer is formed. A pair of these shield layers 18 and 34 sandwiches the MR film 46 to prevent magnetic fluxes from an undesired area from passing through the MR film 46.

The induction type magnetic head 14 uses the upper shield layer 34 of the MR type magnetic head 12 as its lower core. On this lower core, a write gap layer 36, a coil 37 buried in an insulating layer 38, an upper core 40, and a protection film 42 are sequentially stacked. In In recording data by the induction-MR type composite magnetic head 10 shown in FIGS. 12A and 12B, a recording current is flowed through the coil 37 of the induction type magnetic head 14 to generate leakage fluxes in the magnetic gap between the upper and lower cores 40 and 34 and record data in a recording medium by this magnetic field. In reproducing data, a current is flowed from a current source through the MR film 46 via the leads 30 and 31 of the MR type magnetic head 12 to magnetically saturate the SAL film 50 and apply a transverse bias field to the MR film 46 by this saturated magnetic field. While a constant current is flowed through the MR film 46 via the leads 30 and 31, a voltage across the leads 30 and 31 is detected by a sense means while servo tracing a track on a recording medium. A voltage across the MR film 46 is modulated in accordance with the data written in the track so that a reproduction signal is obtained. A track width Tw written by the induction type magnetic head 14 is defined by the pole width of the upper core 40. The width (distance between the leads 30 and 31) of the active region 46c of the MR film 46 is set generally equal to the track width Tw.

Figure 13:
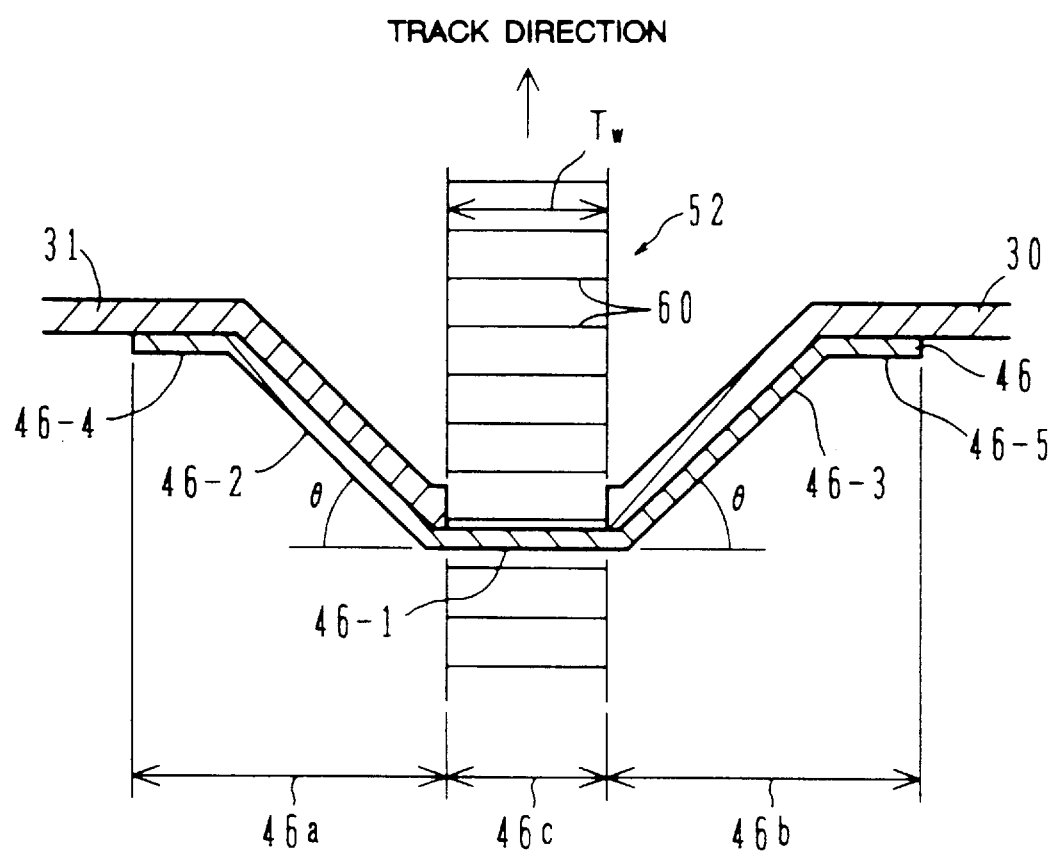
FIG. 13 is a plan view illustrating the reproduction operation by the MR film shown in FIGS. 12A and 12B.

In the reproducing operation by the induction-MR type composite magnetic head 10 constructed as above, as shown in FIG. 13, the active region 46c of the MR film 46 traces the track in parallel to (at an azimuth angle of 0°) the magnetization transition boundary line 60 of a record signal on the track 52. The slanted regions 46-2 and 46-3 constituted by the lead regions 46a and 46b have an azimuth angle θ (for example, about 40°) relative to the magnetization transition boundary line 60 of a record signal.

Figure 14A:
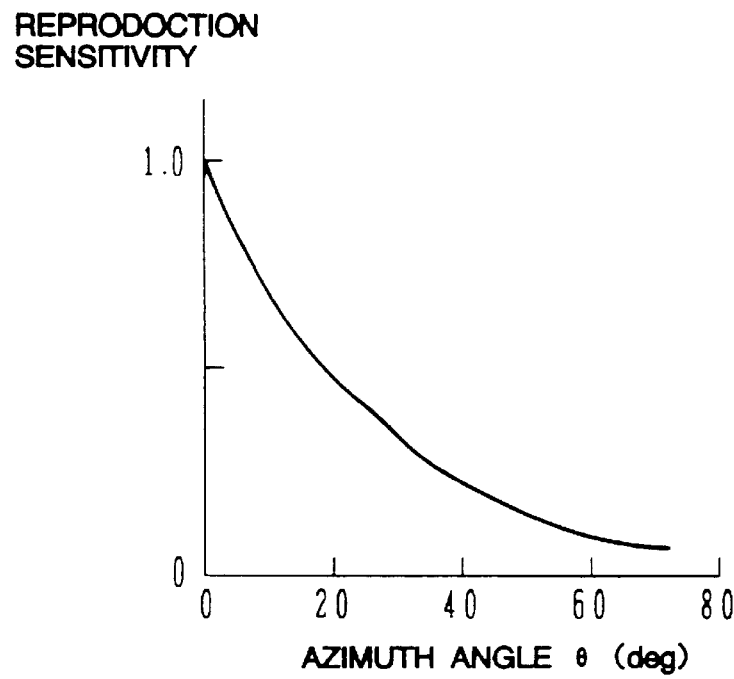
FIGS. 14A and 14B are graphs showing the characteristic of an MR type magnetic head.
Figure 14B:
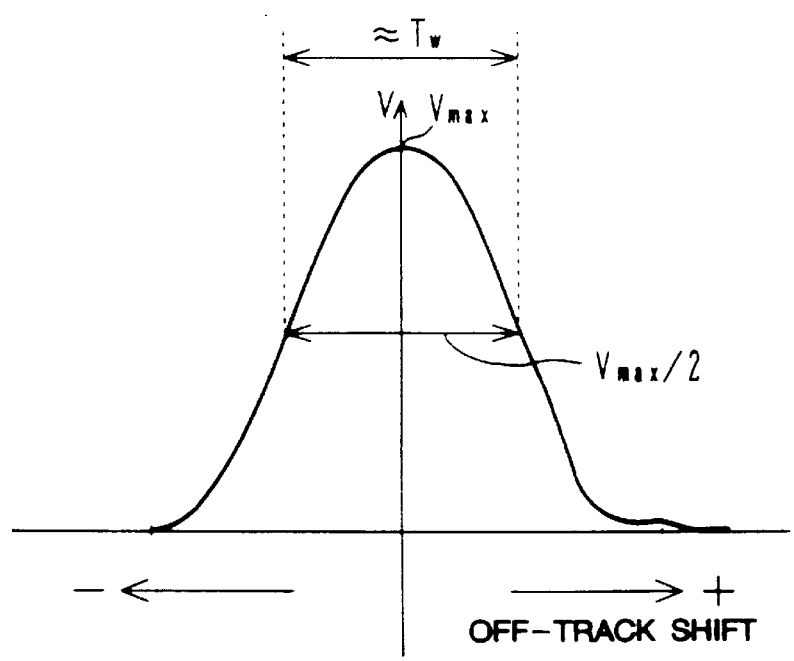

FIG. 14A is a graph showing the experiment result regarding the relationship between an azimuth angle θ of an MR element and a reproduction output at a track width of 1.5 μm and at a record density of 70 kilobits per inch. As the azimuth angle increases from 0°, the reproduction sensitivity quickly lowers. At the azimuth angle θ of about 20°, the reproduction sensitivity is approximately halved, and at the azimuth angle θ of about 40°, the reproduction output lowers to about one fourth that at the azimuth angle θ of 0° and to one tenth or lower than that at about 75°. Therefore, the active region 46c of the MR film 46 shown in FIGS. 12A and 12B has a high sensitivity of a track record signal as conventional, and the amount of signals picked up from the lead regions 46a and 46b can be reduced considerably. As a result, even if the track 52 shifts right and left from the active region 46c, the influence of signals picked up from the region other than the active region 46c can be reduced and the tracking shift or the generation of a side-lobe can be suppressed as shown in the off-track characteristic shown in FIG. 14B. Tracking servo for a narrow track is therefore possible, and high density recording/reproduction can be realized. Cross-talk from adjacent tracks can also be reduced.

Although the peripheral regions 46-4 and 46-5 outward of the lead regions 46a and 46b are parallel to the magnetization transition boundary line 60 of a record signal, the outer peripheral regions 46-4 and 45-5 give almost no influence to the reproduction output because they are far from the active region 46c.

As described above, the off-track characteristic of the MR head can be improved by inclining the regions (inactive region) of the MR film where the leads are connected, relative to the active region of the MR film.

With the above structure, however, it is necessary first to form an underlying structure having an inverted trapezoid cross section, to form an MR film on the underlying structure, and then to precisely form leads on the MR film.

It is more preferable if an MR film is once deposited, the inactive regions slanted from the active region and connected to the leads can be formed in a self-alignment manner.

Embodiments of the present invention will be described.

Figure 1A:
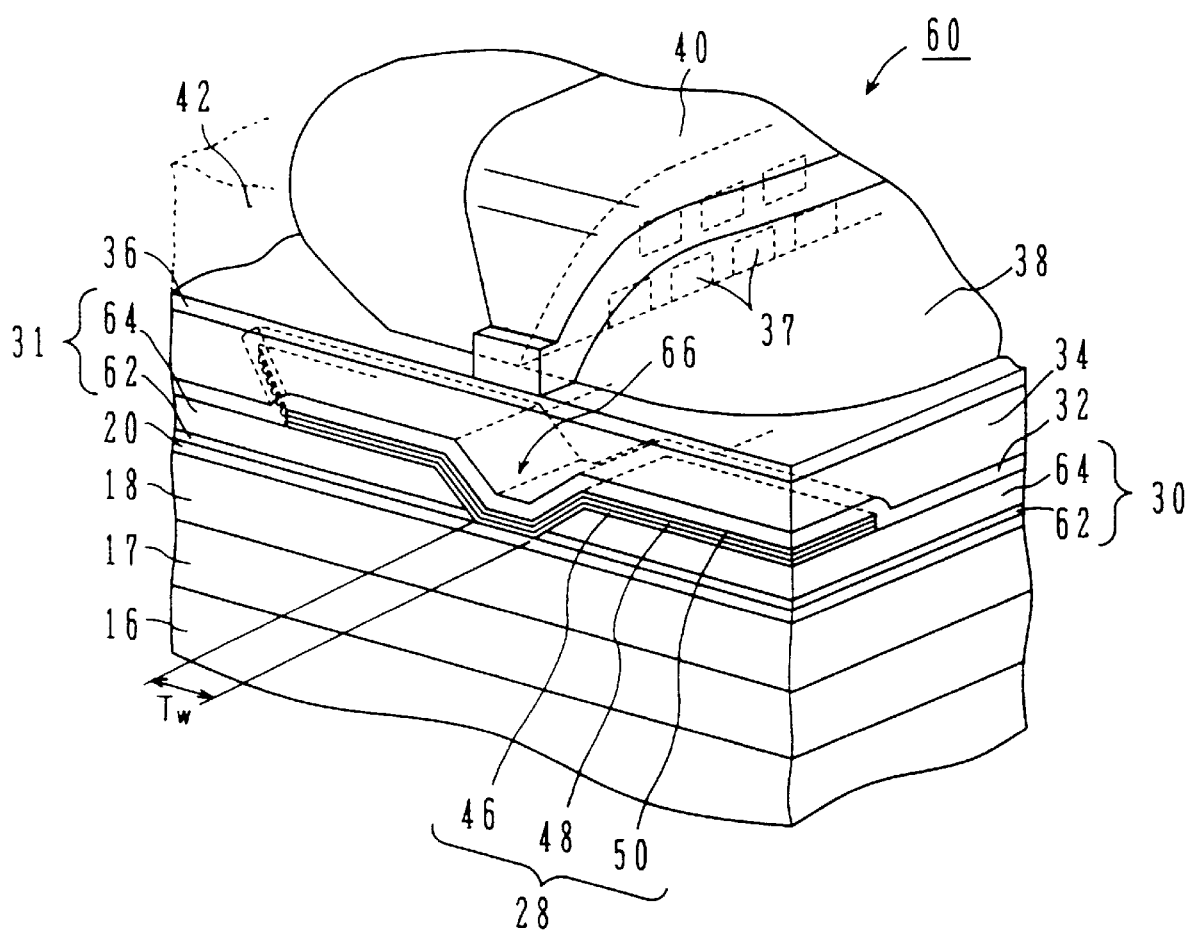

FIGS. 1A and 1B show a magnetic head using a magneto-resistance (MR) film having a gull-wing shaped cross section.

FIG. 1A is a perspective view of the magnetic head as seen from a recording medium counter plane side, and FIG. 1B is a front view of the magnetic head. An induction-MR type composite magnetic head 60 is formed by a laminate of an MR type magnetic head 12 and an induction type magnetic head 14 stacked in this order. Both the heads 12 and 14 are formed by adopting thin film forming technique.

In the MR type magnetic head 12, a lower shield layer 18 is formed on a slider substrate 16 at its rear end portion. On the lower shield layer 18, a lower gap layer 20 of insulating material is deposited. On the lower gap layer 20, leads 30 and 31 are formed each being a laminate of a magnet film (hard magnet film such as CoCrTa) 62 and a conductive film (non-magnetic conductive film such as W, Ta, and Nb) 64. This laminate is separated by a trapezoid trench 66 reaching the lower gap layer 20 to form the leads 30 and 31.

On the leads 30 and 31 and along the trench 66, a sensor unit 28 is formed which is a laminate of an MR film 46, a spacer layer 48, and an SAL bias layer 50. Because the underlying layer has the trench of an inverted trapezoid cross section, the MR film 46 has a linear region 46-1 (trapezoidal bottom region), opposite slanted regions 46-2 and 46-3, and outside peripheral regions 46-4 and 46-5. The linear region 461 is disposed generally parallel to a magnetization transition boundary line of a signal recorded on a track during a reproduction operation (in other words, generally parallel to a write gap 36). The slanted regions 46-2 and 46-3 are inclined at the opposite sides of the linear region 46-1 by an angle θ relative to a line extended from the linear region 46-1 (i.e., relative to a magnetization transition boundary line of a signal recorded on a track). The outer peripheral regions 46-4 and 465 are formed outside of the slanted regions 46-2 and 46-3 on the top surfaces of the leads 30 and 31. The linear region 46-1 is in contact with the lower gap layer 20. The slanted regions 462 and 46-3 and the outer peripheral regions 46-4 and 46-5 are electrically connected to the leads 30 and 31. Of the MR film 46, the linear region 46-1 clearly defined by the sharp under edges of the leads 30 and 31 forms an active region 46c and defines a track width Tw, and the slanted regions 46-2 and 46-3 and outer peripheral regions 46-4 and 46-5 respectively connected to the leads form inactive lead regions 46a and 46b via which current is flowed through the linear region 46-1. The angle θ of the slanted regions 46-2 and 46-3 relative to a line extended from the bottom plane of the linear region is preferably about 20°<θ<about 75° as described earlier. A larger angle θ gives the larger azimuth effect. However, if the angle θ is too large, the film thickness of the sensor unit 28 formed by sputtering or the like becomes thin at the slanted regions 46-2 and 46-3. Furthermore, a crevasse is likely to be formed in the sensor unit 28 at a boundary area (bent area) between the slanted regions 46-2 and 46-3 and linear region 46-1, and an electrical conduction is lost at the worst. Therefore, in order to deposit the sensor unit 28 uniformly and avoid such a crevasse, the upper limit of the angle θ is preferably about 75°.

On the other hand, if the angle θ is too small, the boundary between the slanted regions 46-2 and 46-3 and linear region 46-1 becomes vague, and the azimuth effect is lowered. The lower limit of the angle θ is therefore preferably about 20°.

The end portion of the sensor unit 28 is patterned obliquely in a longitudinal direction (current flow direction) as indicated at the left side in FIG. 1A and taught by the U.S. Pat. application Ser. No. 08/497,388 filed on Jun. 30, 1995, now abandoned which is incorporated therein by reference.

The magnet film 62 of the leads 30 and 31 constitute a fixed bias permanent magnet (uniaxial anisotropy bias magnet film) for generating a longitudinal bias field so as to form a single magnetic domain. The magnet film 62 functions to suppress the shape or form anisotropy effect generated at the bent portion (boundary portion) between the linear region 46-1 and slanted regions 46-2 and 46-3 of the MR film 46, and improves the uniaxial anisotropy of the MR film 46. The magnet film 62 is magnetized in a direction parallel to the track width direction of the MR film 46 (in the easy axis direction of magnetization of the MR film 46). On the sensor unit 28 and leads 30 and 31, an upper gap layer 32 of insulating material is formed. On the upper gap layer 32, an upper shield layer 34 is formed.

In the structure shown in FIGS. 12A and 12B, the bias permanent magnet film 54 for generating a single magnetic domain is sandwiched between the lower shield sub-layers 18-1 and 18-2. If the magnet film 54 is in direct contact with the lower shield sub-layers 18-1 and 18-2, they are magnetically coupled and a generated magnetic field is almost impossible to be applied to the outside. To avoid this, it becomes necessary to place the non-magnetic spacers 56 and 58 between the magnet film 54 and the lower shield sub-layers 18-1 and 18-2.

In the structure shown in FIGS. 1A and 1B, the magnet film 62 of the leads 30 and 31 for generating a single magnetic domain is placed between the non-magnetic lower gap layer 20 and the non-magnetic conductive film 64. Therefore, additional non-magnetic spacers are not necessary, simplifying the structure and processes.

The induction type magnetic head 14 uses the upper shield layer 34 of the MR type magnetic head 12 as its lower core layer. On this lower core, a write gap layer 36, a coil 37 buried in an insulating layer 38, an upper core 40, and a protection film 42 are sequentially stacked.

In recording data by the induction-MR type composite magnetic head 10 shown in FIGS. 1A and 1B, a recording current is flowed through the coil 37 of the induction type magnetic head 14 to generate leakage fluxes in the magnetic gap between the upper and lower cores 40 and 34 and record data in a recording medium by this magnetic field. In reproducing data, a current is flowed from a current source through the MR film 46 via the leads 30 and 31 of the MR type magnetic head 12 to magnetically saturate the SAL film 50 and apply a transverse bias field to the MR film 46 by this saturated magnetic field. While a sense current is flowed through the MR film 46 via the leads 30 and 31, a voltage across the MR film 46 is detected by a sense means while tracing a track on a recording medium. A voltage across the MR film 46 is modulated in accordance with the data written in the track so that a reproduction signal is obtained. A track width Tw written by the induction type magnetic heat 14 is defined by the tip (pole) width of the upper core 40. The width (distance between the leads 30 and 31) of the active region 46c of the MR film 46 is set generally equal to the track width Tw.

The method of manufacturing the induction-MR type composite magnetic head 60 shown in FIGS. 1A and 1B will be described with reference to FIGS. 2A to 2L.

Figure 2A:
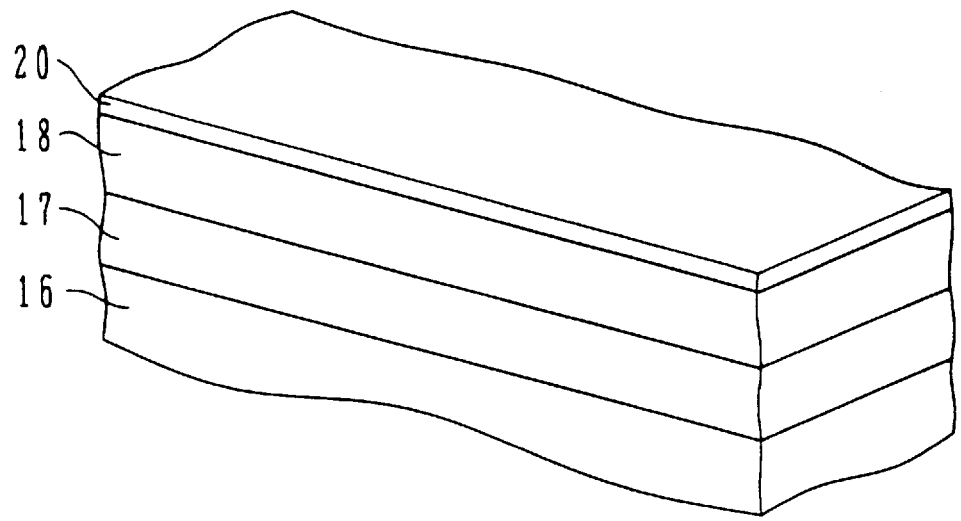

As shown in FIG. 2A, on a substrate 16 made of ceramic material such as $Al_2O_3$- TiC or other materials, a protection film 17 such as alumina ($Al_2O_3$) is formed. On the protection film 17, a lower shield layer 18 and a lower gap layer 20 are formed. The lower shield layer 18 is formed on the protection film by depositing soft magnetic material such as permalloy (NiFe) and Sendust through sputtering, vapor deposition, plating, or the like.

Figure 2B:
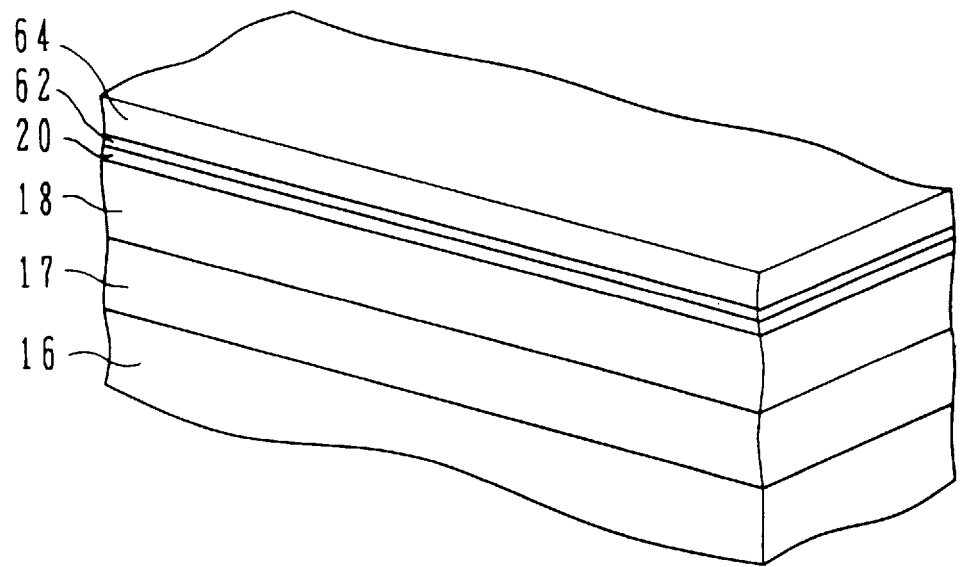

As shown in FIG. 2B, on the lower gap layer 20, a hard magnetic film 62 and a conductive film 64 are formed by sputtering, vapor deposition, plating, or the like. In this case, the upper conductive film 64 is formed thick while considering a film thickness to be etched by a milling process for the whole surface of the substrate illustrated in FIG. 2D to be later described. For example, CoCrTa is deposited 100 to 1000 angstroms to form the hard magnetic film 62, W or Ta is deposited 1500 to 4500 angstroms to form the conductive film 64.

Figure 2C:
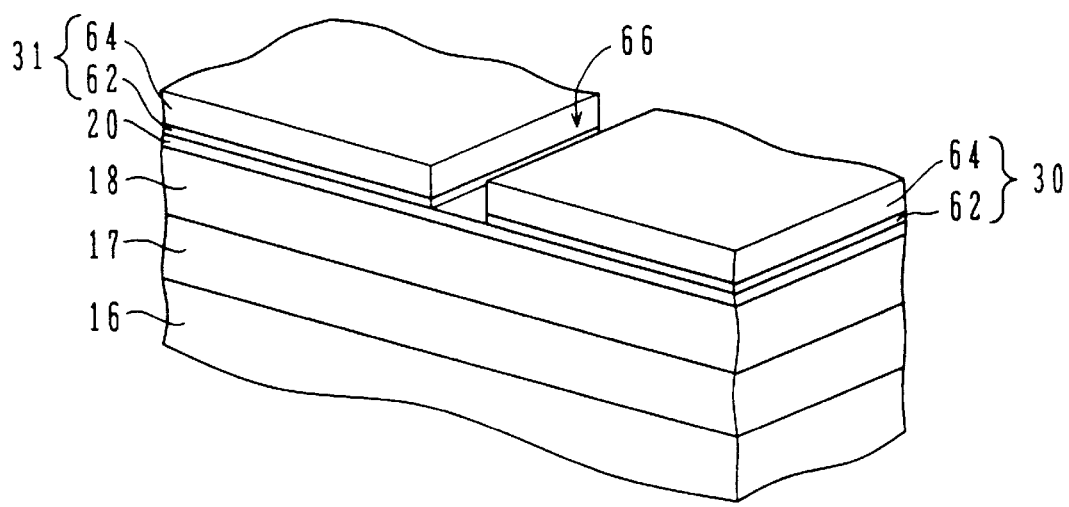

As shown in FIG. 2C, in order to form an active region 46c of a sensor unit 28 between the slanted regions of a gull-wing shape, the conductive film 64 and magnet film 62 are vertically cut to form a recess 67. The width of the recess 67 is set slightly narrower than the width of the active region 46c. For example, a resist film is coated on the conductive film 64 to a thickness three times or more of the total thickness of the conductive film 64 and magnet film 62, an opening having a predetermined width is formed in the resist film, and the recess 67 is formed to expose the surface of the conductive film 64. Anisotropic etching such as milling is performed to vertically trench the conductive film 64 and magnet film 62 at the exposed width. The magnet film 62 is trenched to the thickness which will be removed at the later whole surface milling process illustrated in FIG. 2D. After this trenching, the resist film is removed.

Figure 2D:
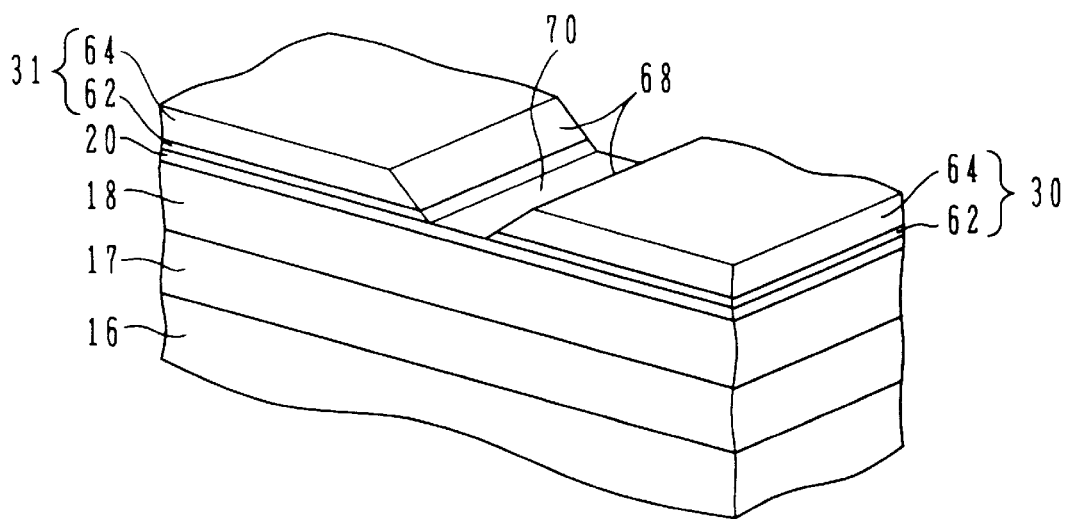

As shown in FIG. 2D, ion beams are vertically applied over the conductive film 64 to mill the whole surface of the substrate. This whole surface milling process will be described with reference to FIGS. 3A to 3D.

Figure 3A:
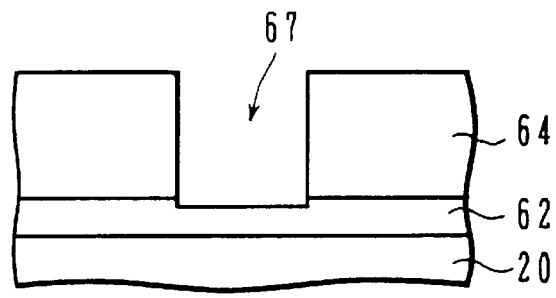
FIGS. 3A to 3D are cross sectional views illustrating the details of an example of the trenching process illustrated in FIG. 2D.

As shown in FIG. 3A, a recess 67 having a vertical side wall is formed.

Figure 3B:
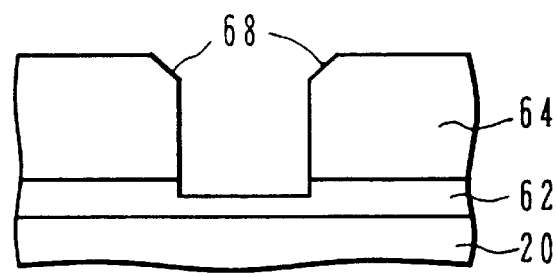

As shown in FIG. 3B, milling particles are bombarded vertically. Since the upper edge portion of the opening of the recess 67 is inclined at various angles relative to milling particles, the edge portion is milled at an angle with the fastest rate (about three times the rate of the flat surface) and slanted surfaces 68 are formed.

Figure 3C:
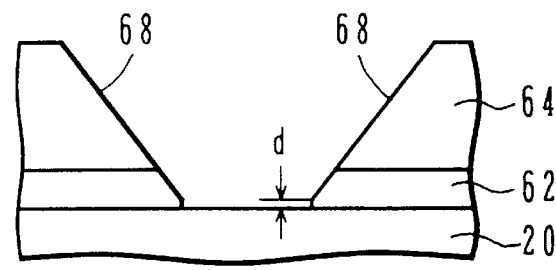

As shown in FIG. 3C, as the milling progresses, one end of the slanted surface 68 reaches the lower gap layer 20 to be exposed. At this time, a small step d is left at the slanted surfaces. In order to remove this step d, the milling is further performed (additional milling). The milling rate at the lower gap layer 20 (alumina) is slower and is about one third of the milling rate at the conductive film 64 (W, Ta, Nb, or the like) and the magnet film 62 (CoCrTa). Therefore, the lower gap layer 20 is milled less.

Figure 3D:
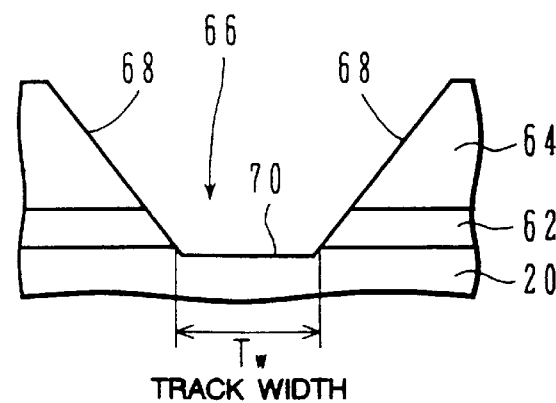
Figure 5A:
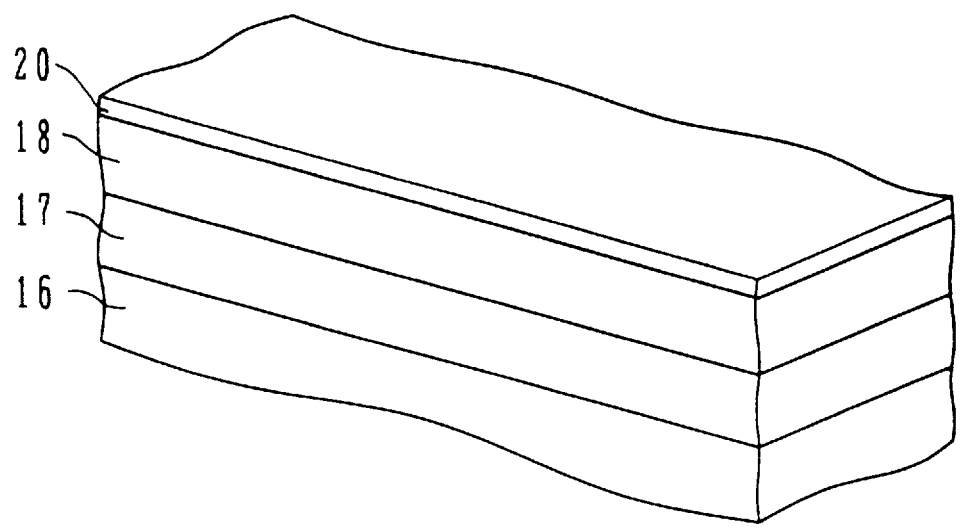
FIGS. 5A to 5L are cross sectional views illustrating the processes of manufacturing the induction-MR type composite magnetic head shown in FIG. 4.
Figure 5B:
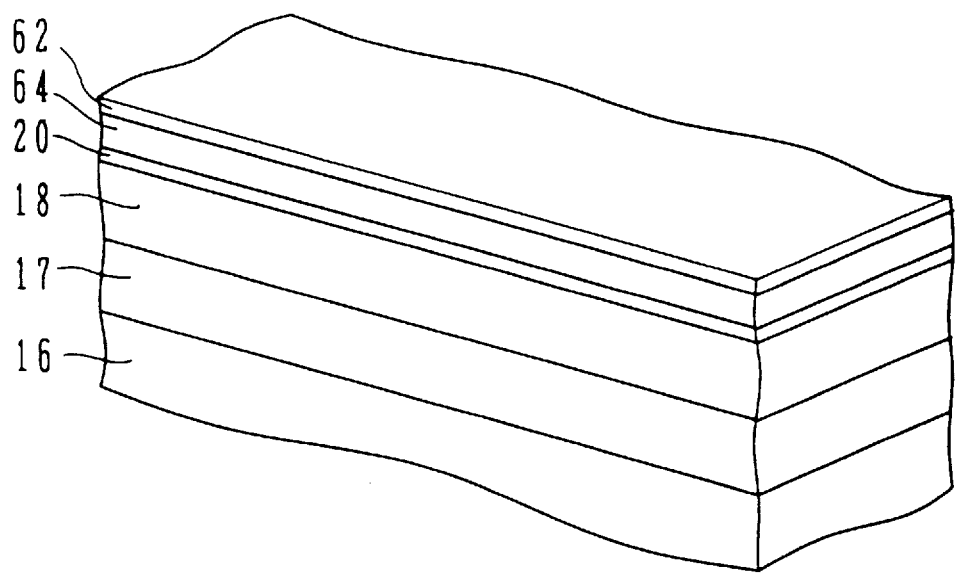
Figure 5C:
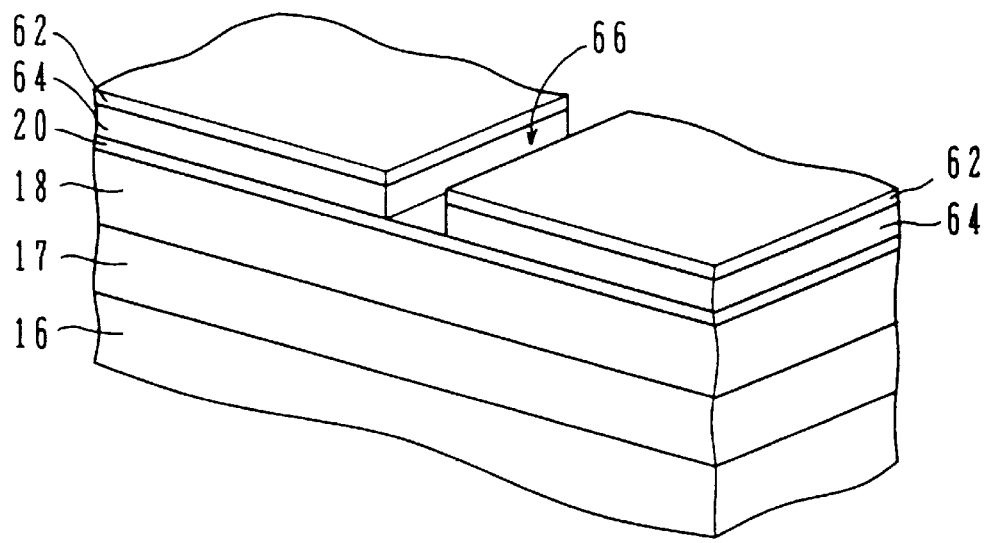
Figure 5D:
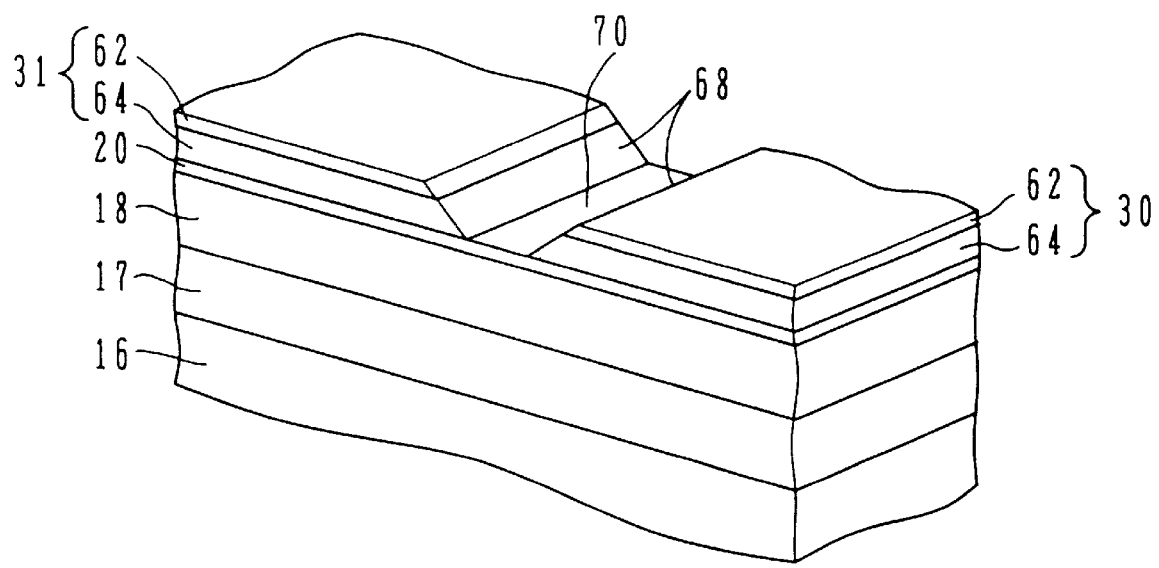
Figure 5E:
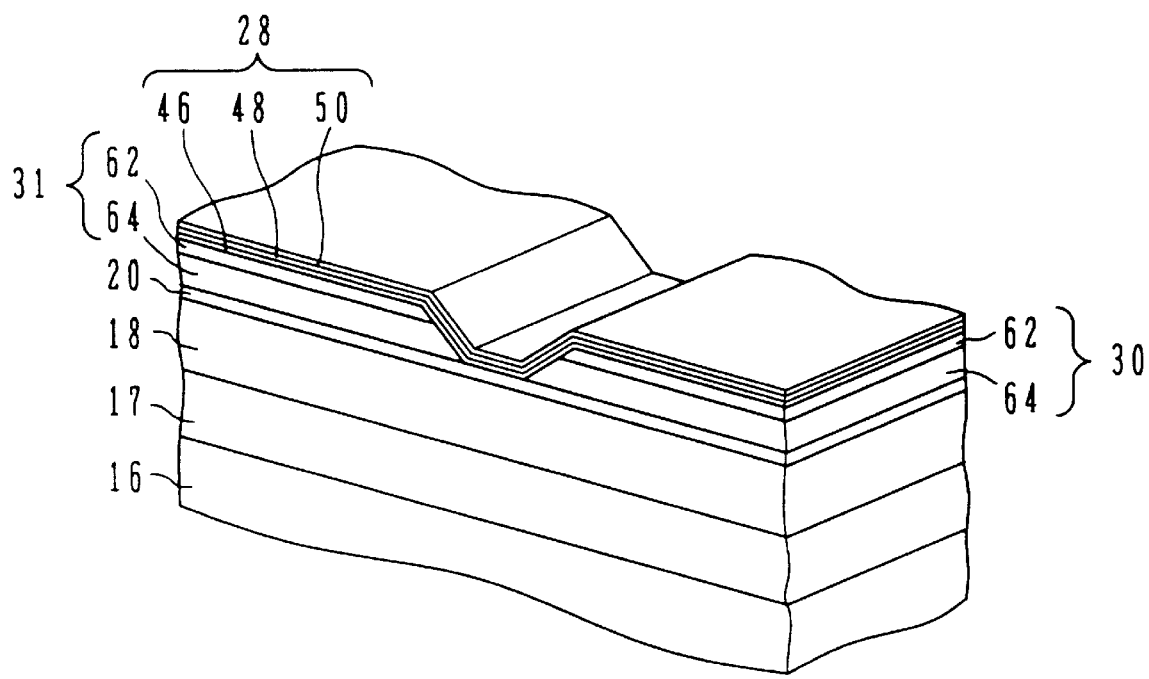
Figure 5F:
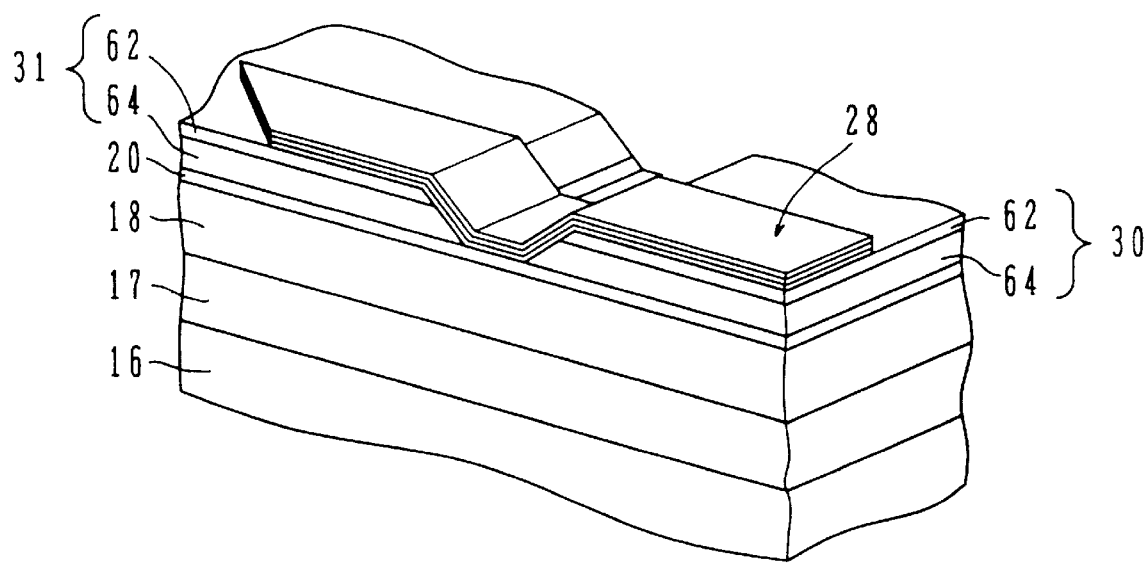
Figure 5G:
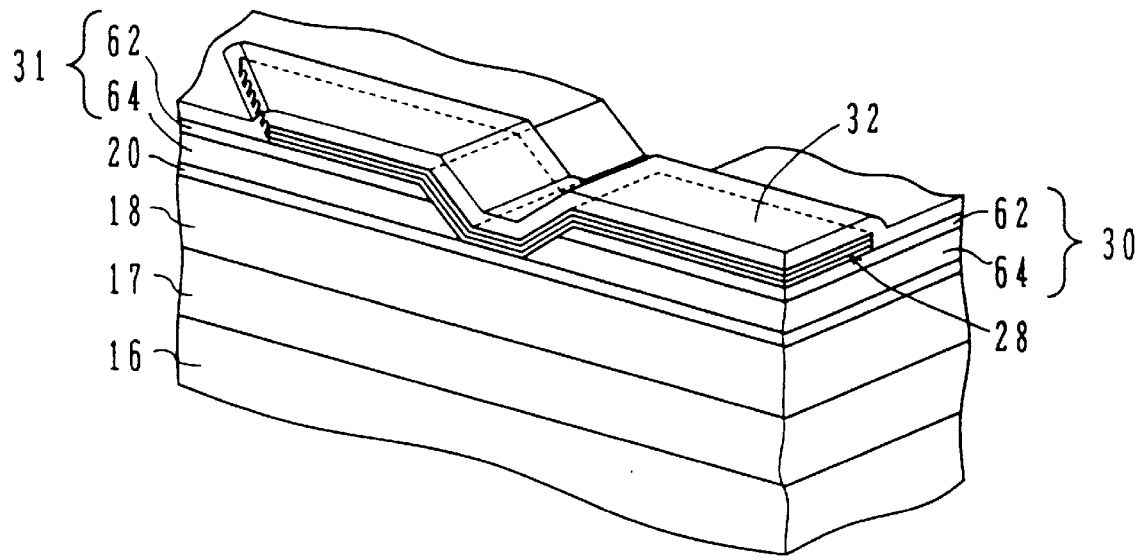
Figure 5H:
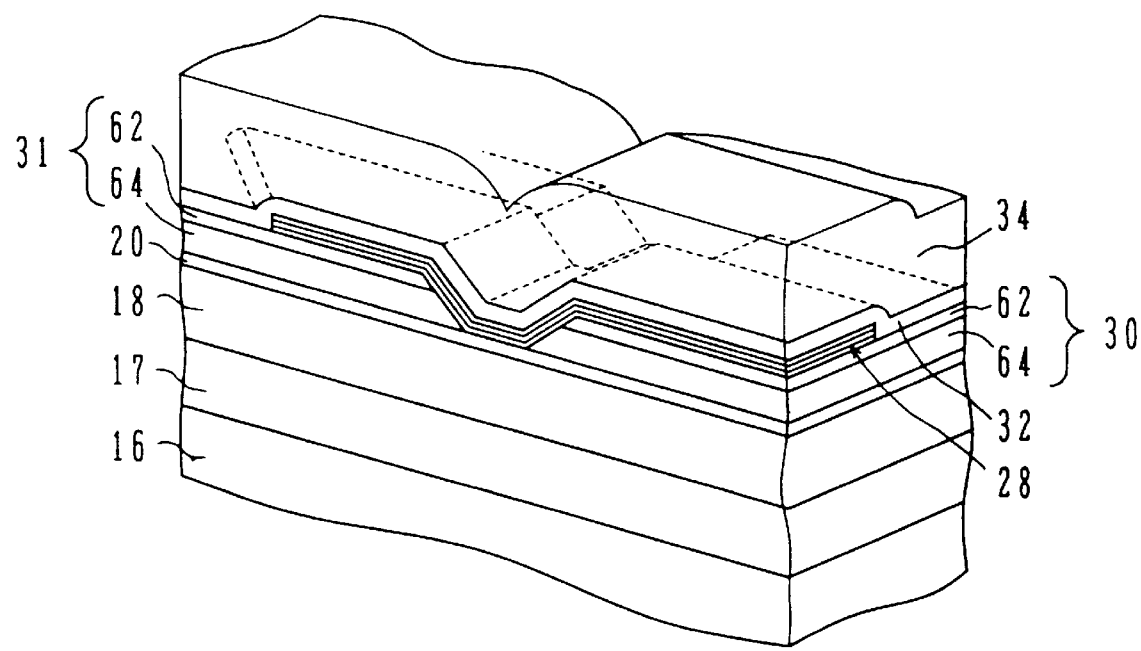
Figure 5I:
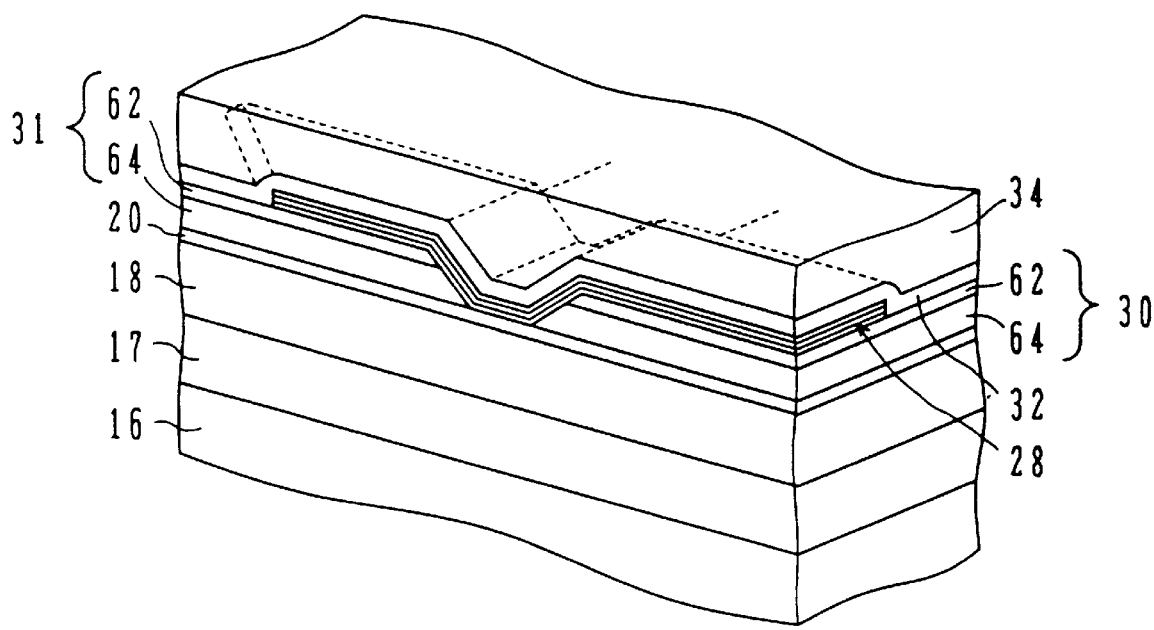
Figure 5J:
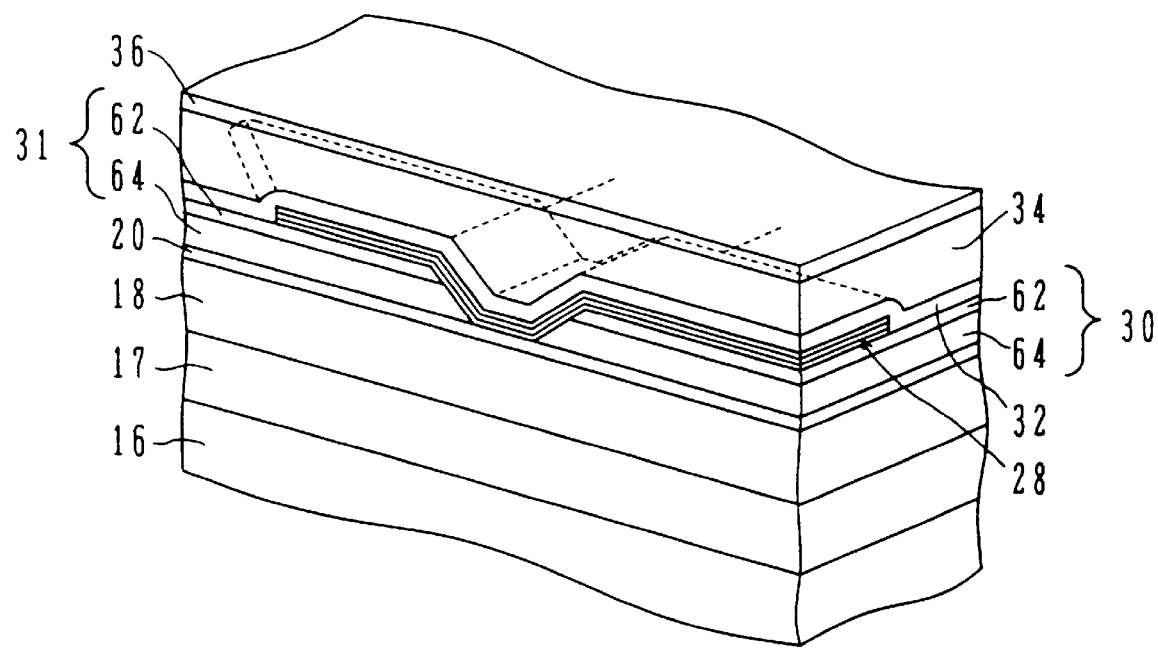
Figure 5K:
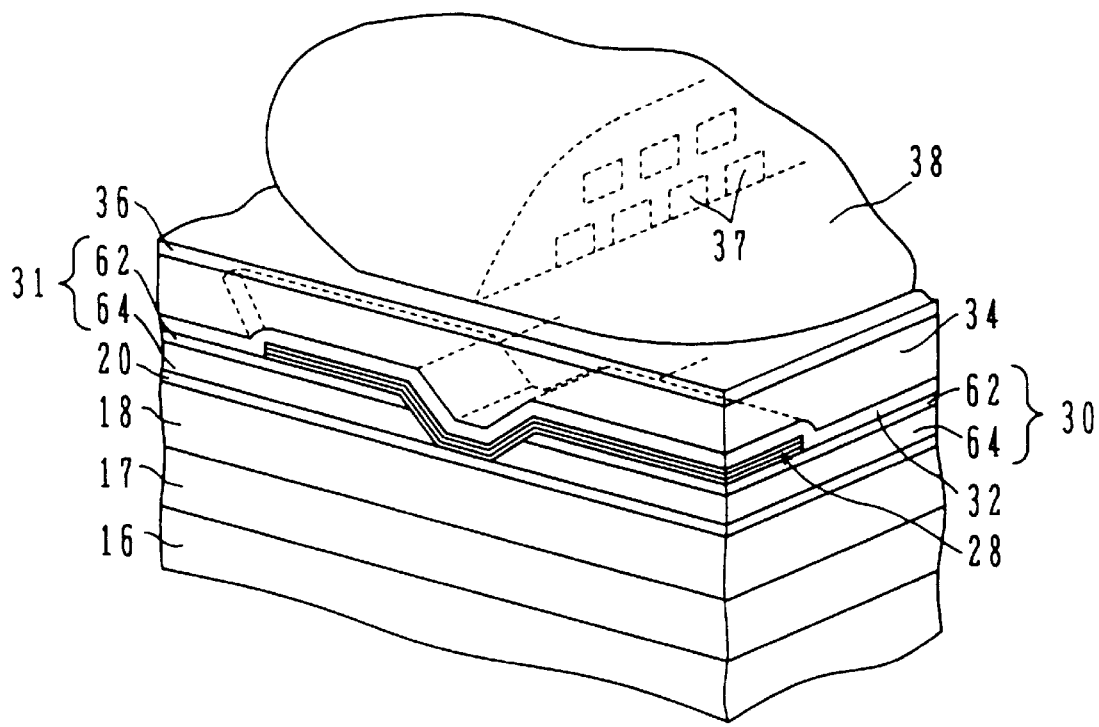
Figure 5L:
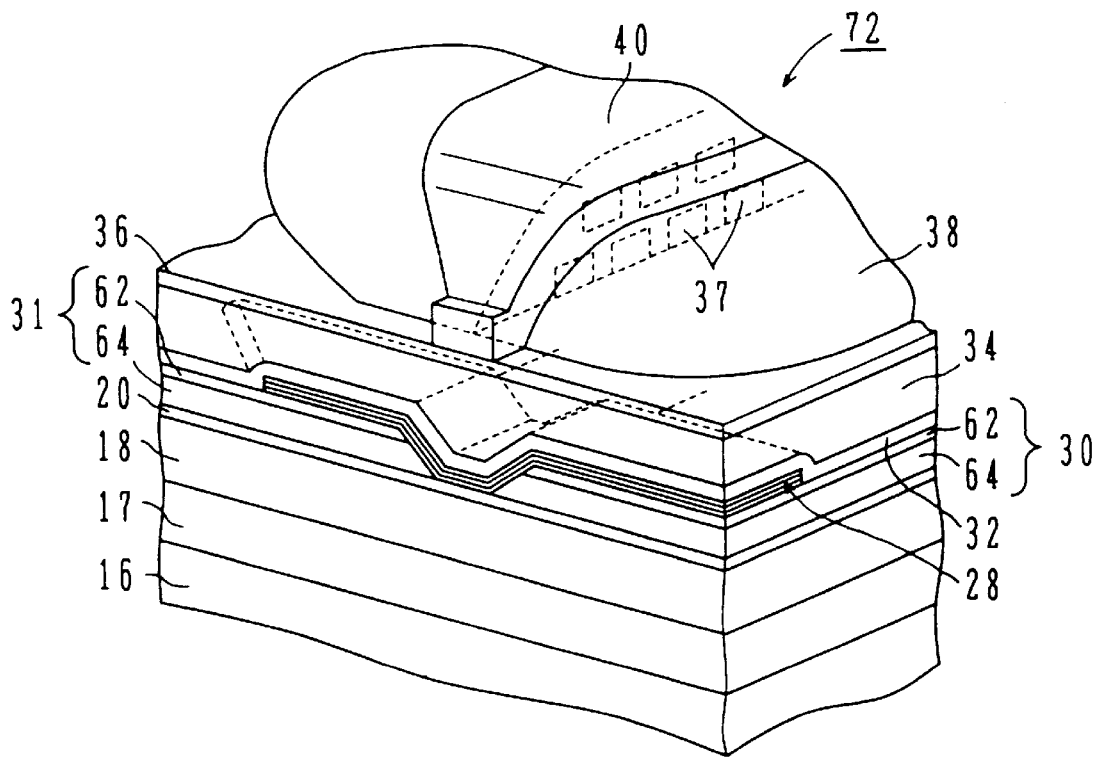
Figure 7A:
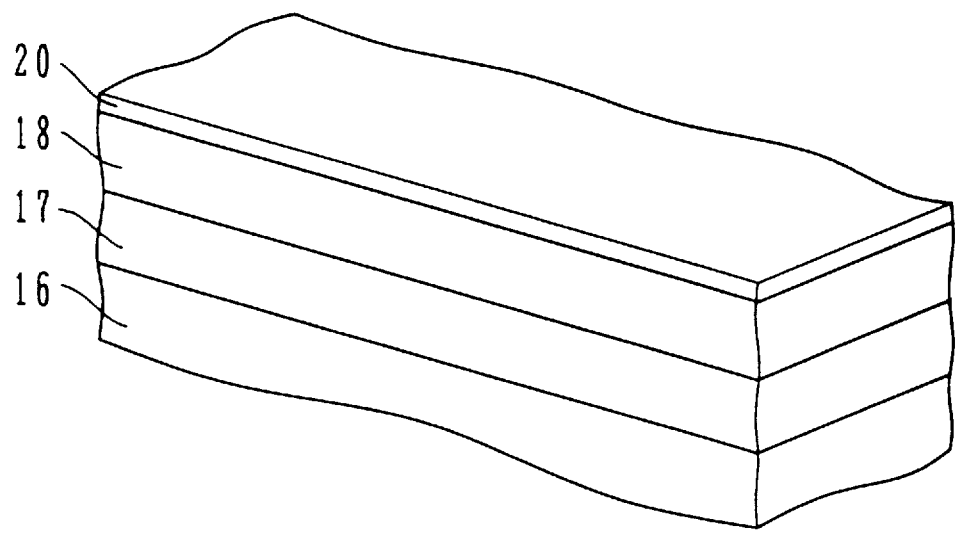
FIGS. 7A to 7L are cross sectional views illustrating the processes of manufacturing the induction-MR type composite magnetic head shown in FIG. 4.
Figure 7B:
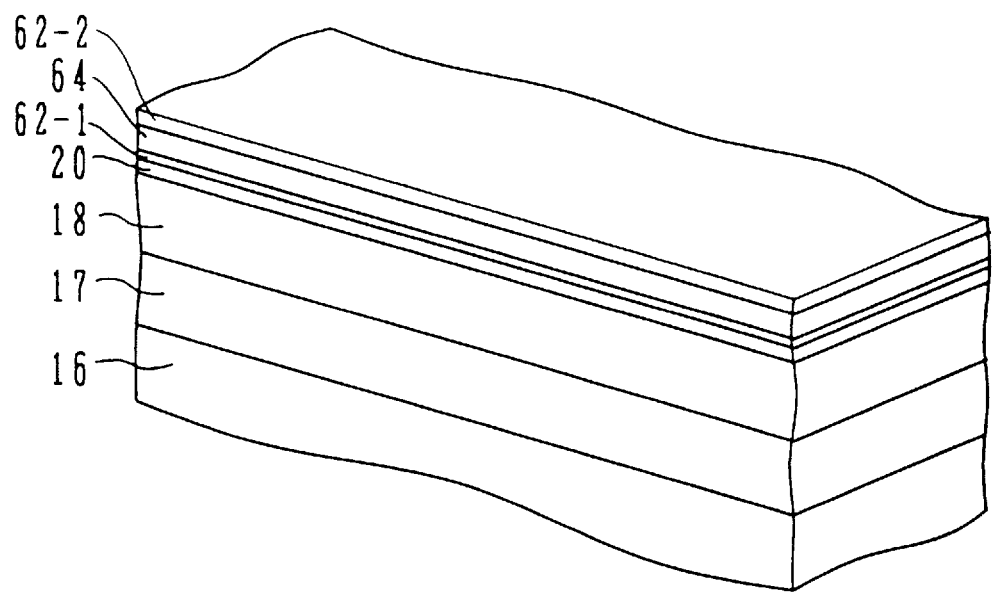
Figure 7C:
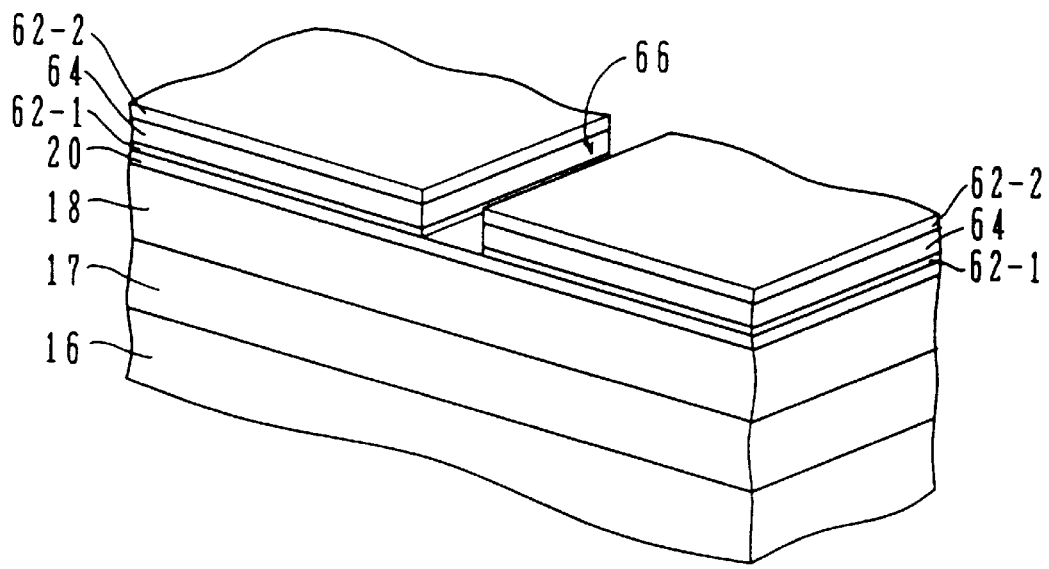
Figure 7D:
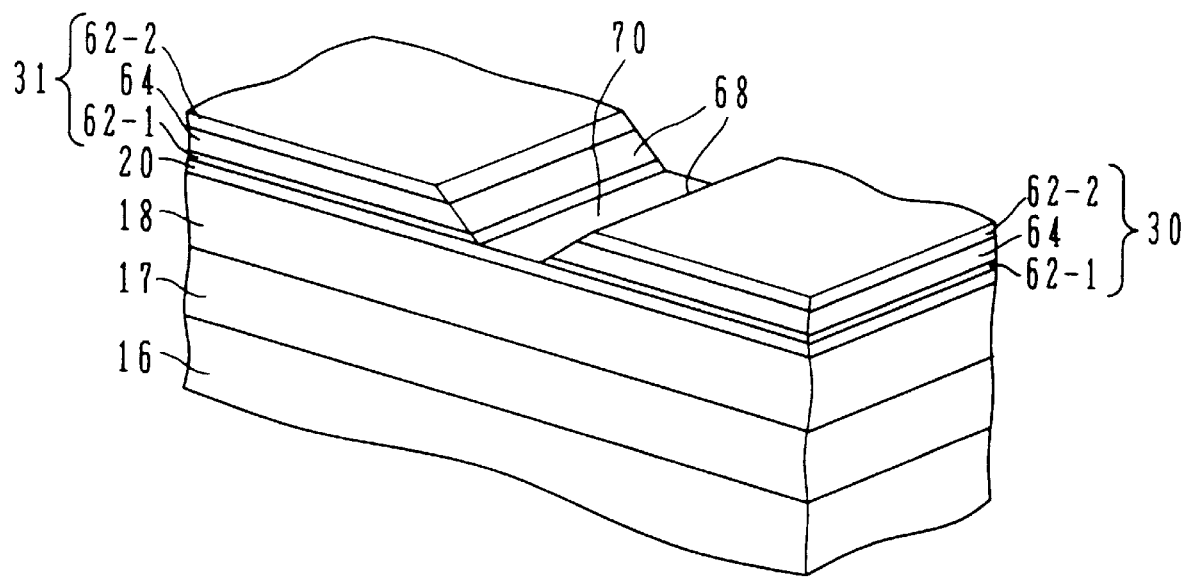
Figure 7E:
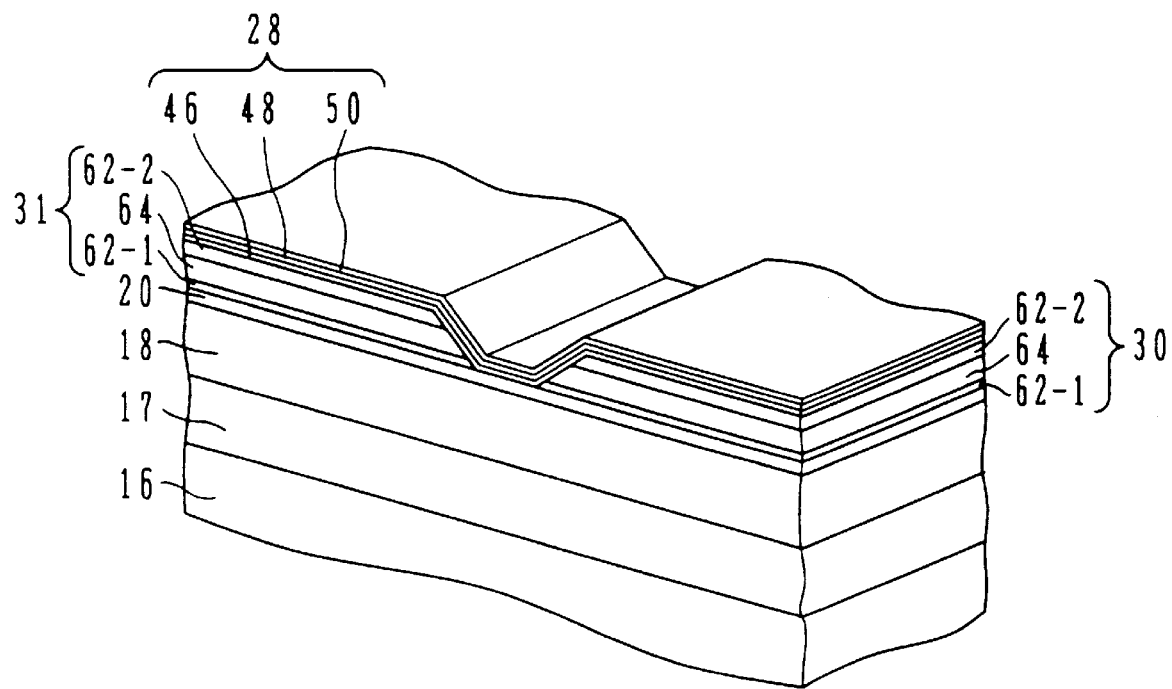
Figure 7F:
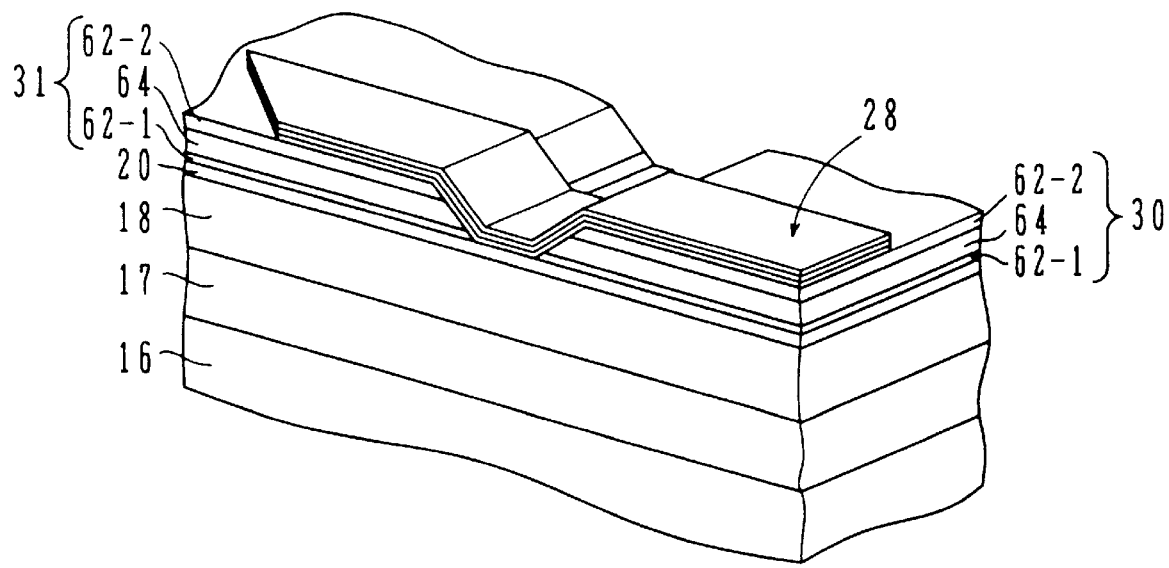
Figure 7G:
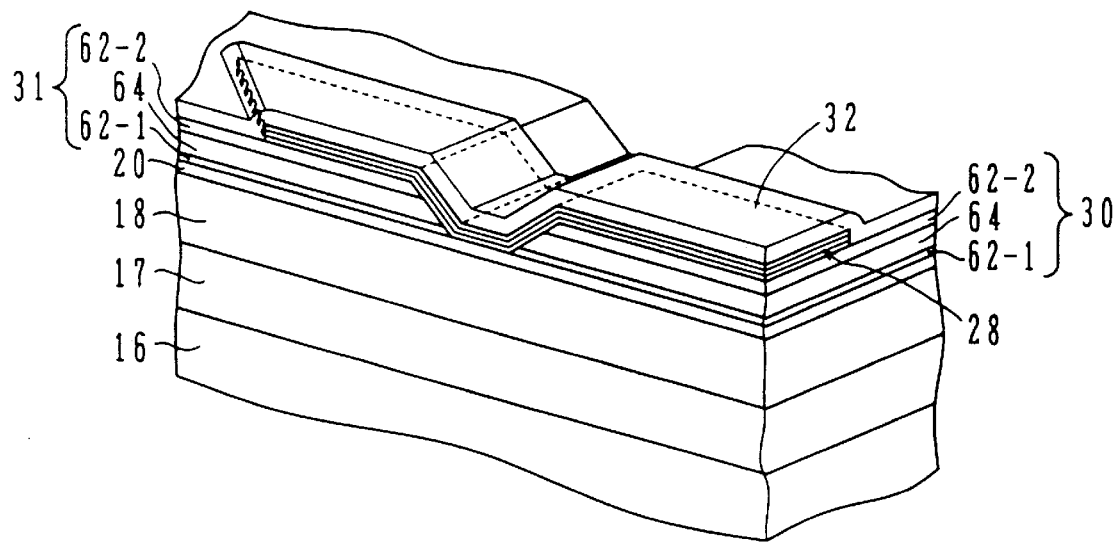
Figure 7H:
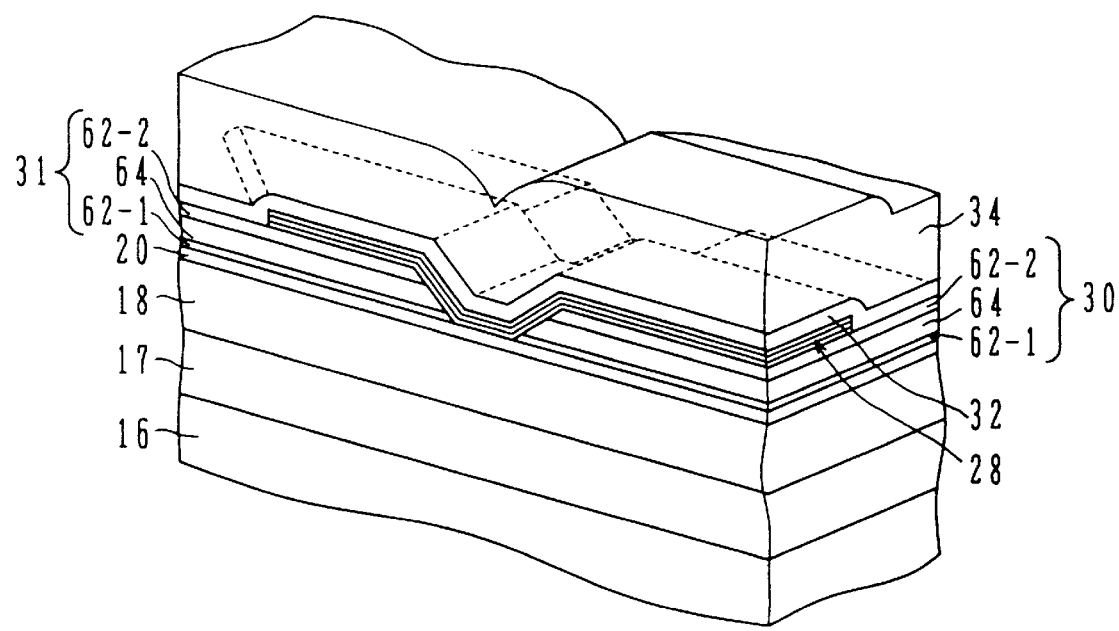
Figure 7I:
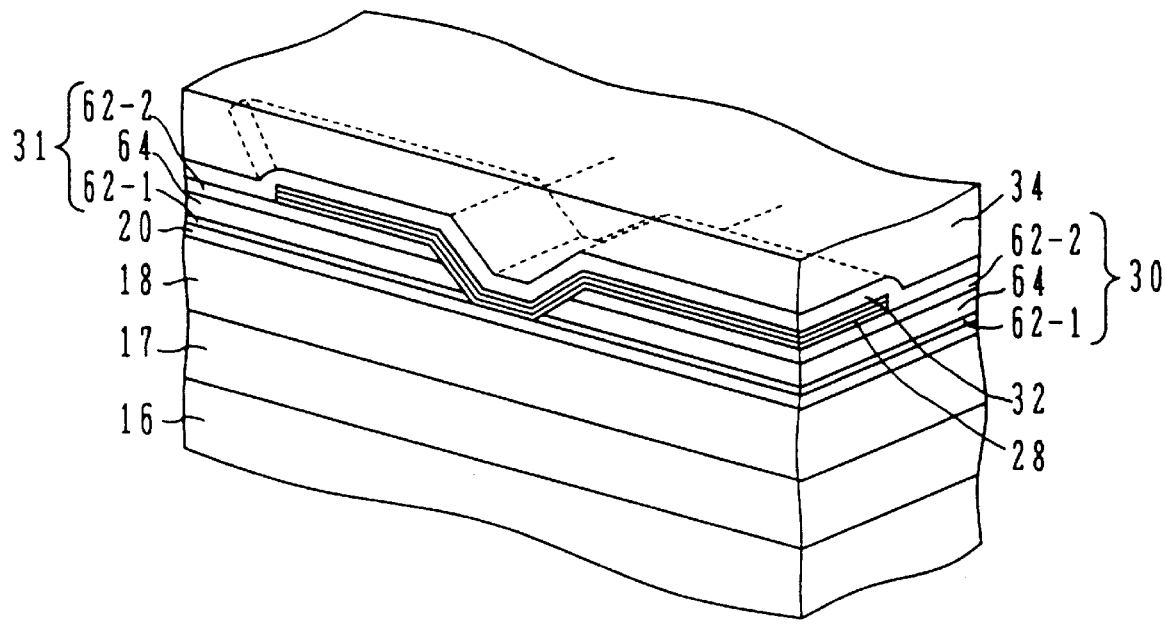
Figure 7J:
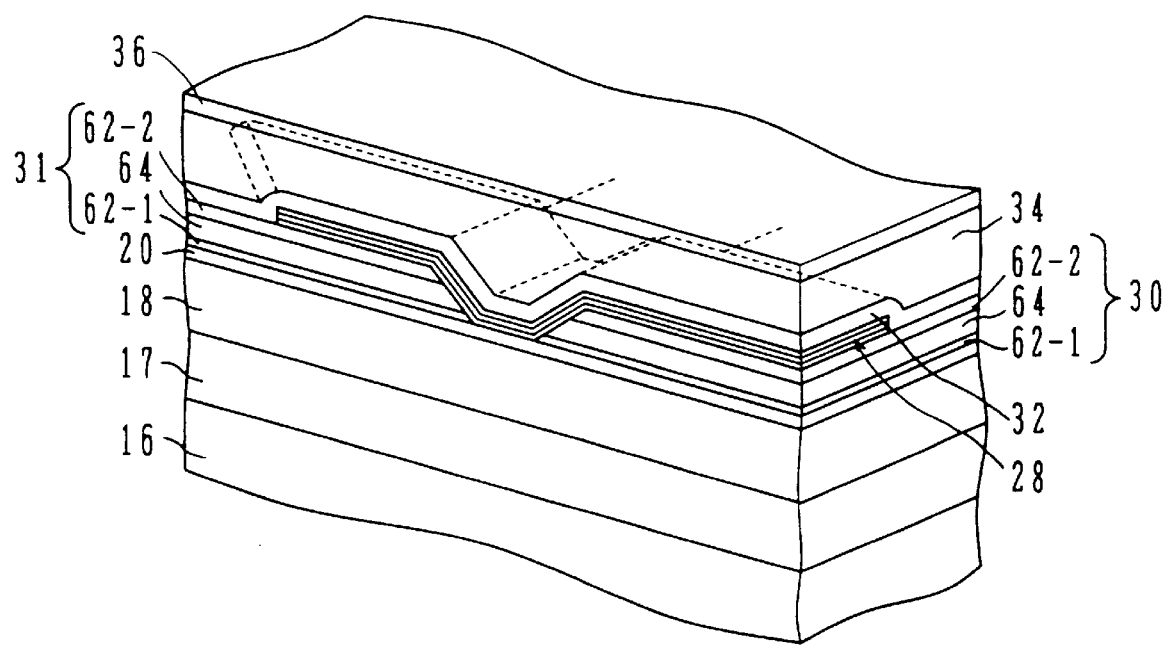
Figure 7K:
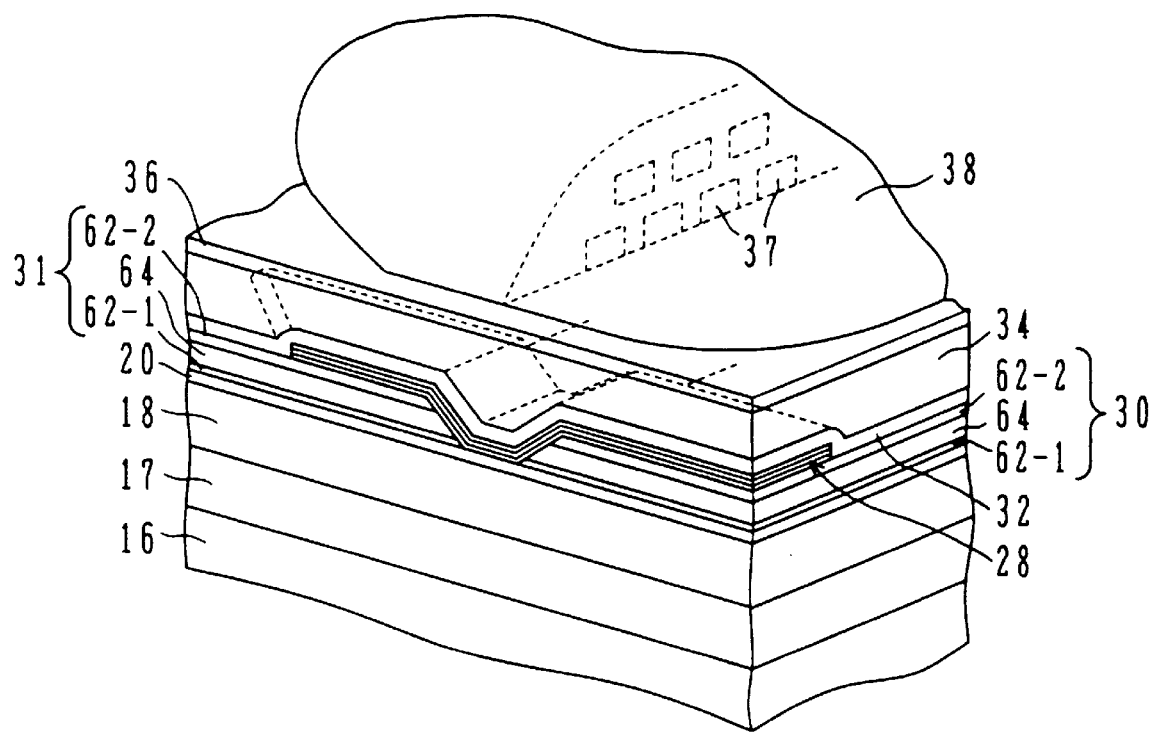
Figure 7L:
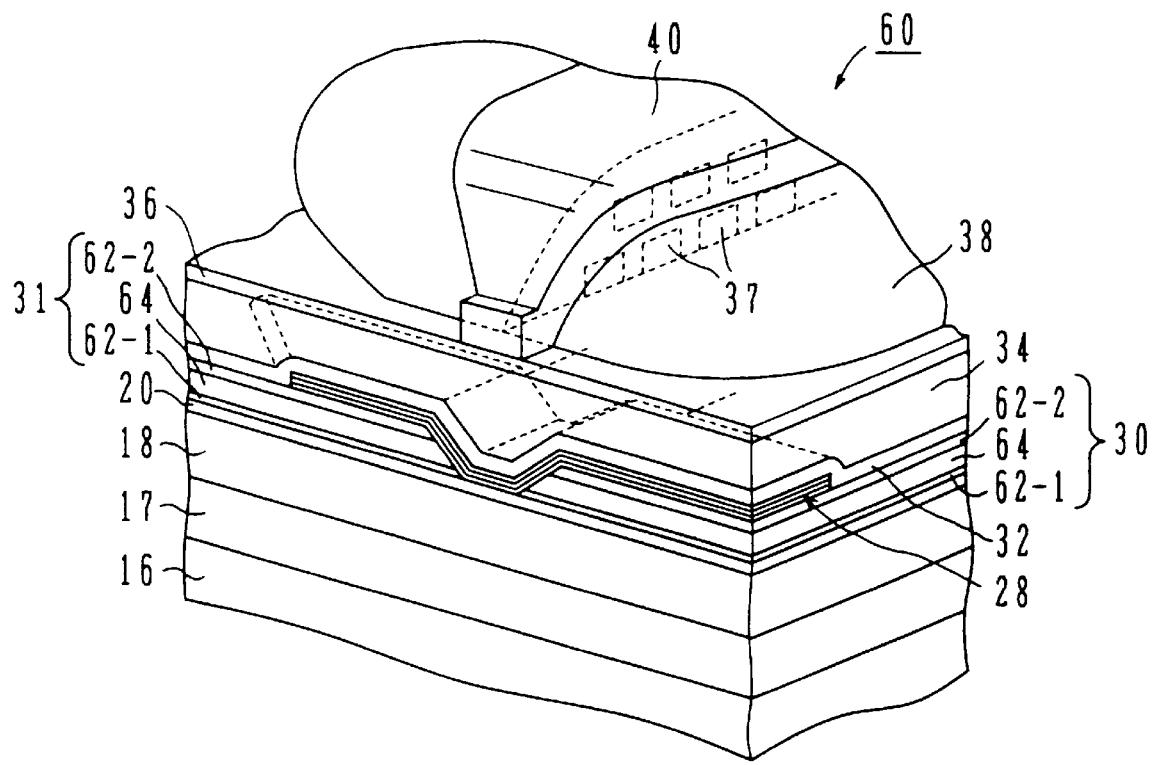
Figure 8A:
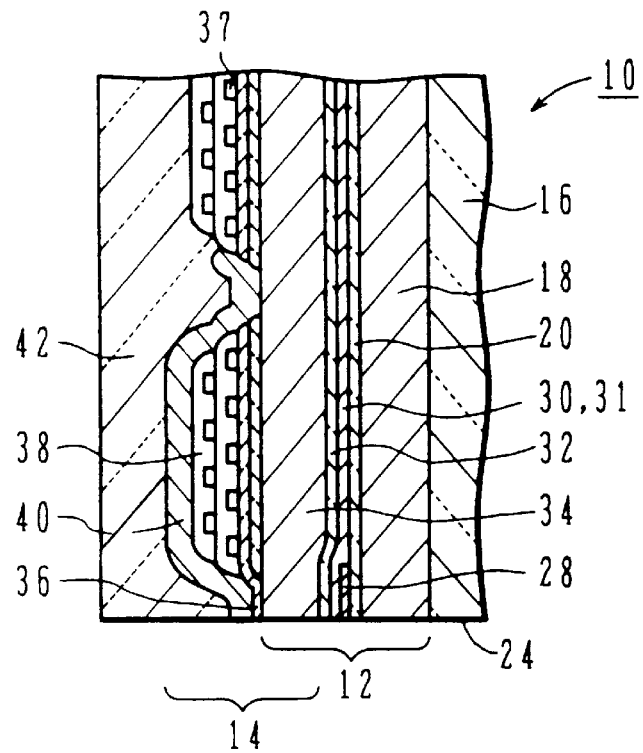
FIGS. 8A and 8B are a cross sectional view of a conventional induction-MR type composite magnetic head for hard disks and a perspective view of the magnetic head as seen from the recording medium counter plane side.
Figure 8B:
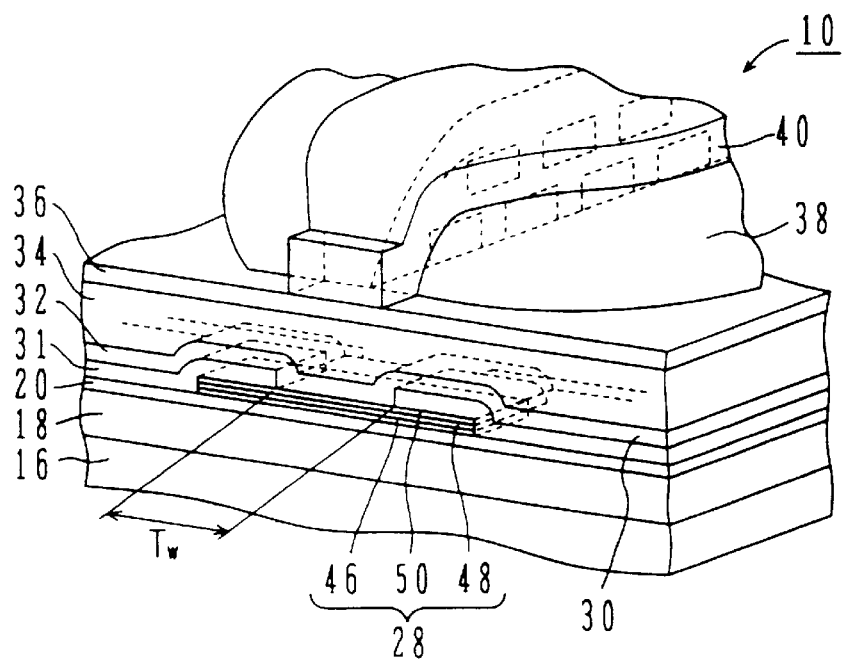
Figure 9A:
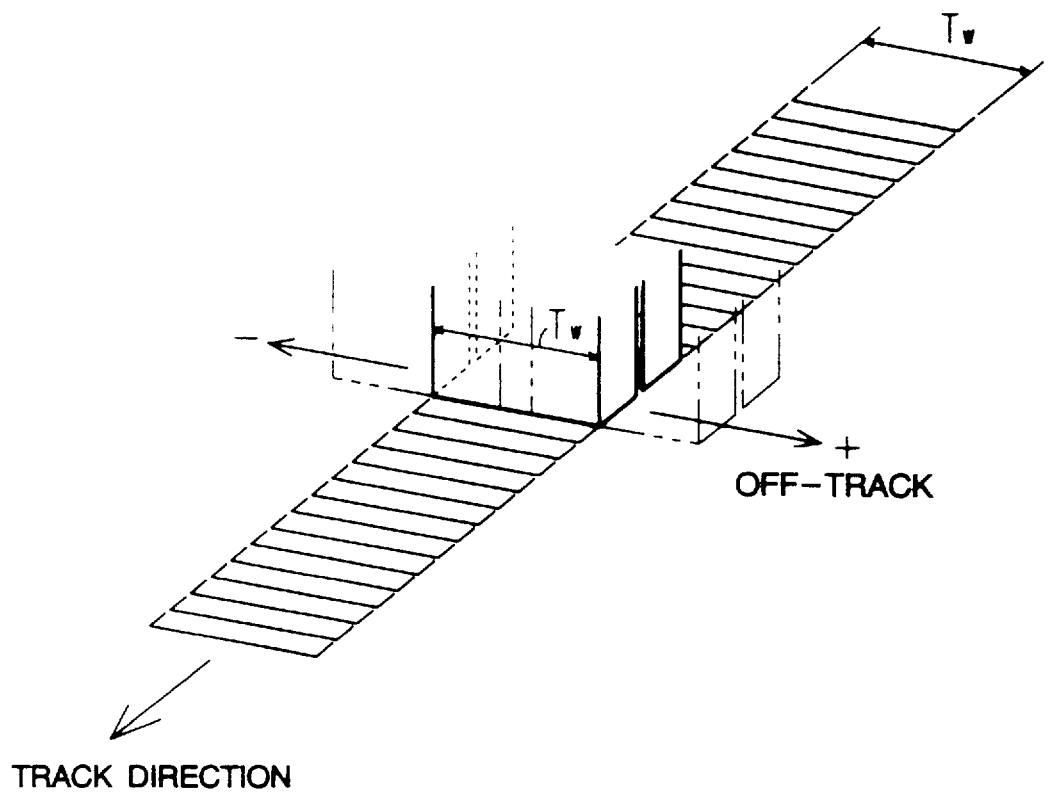
FIGS. 9A and 9B are a perspective view illustrating a read/write operation by an induction type magnetic head and a graph showing the off-track characteristic.
Figure 9B:
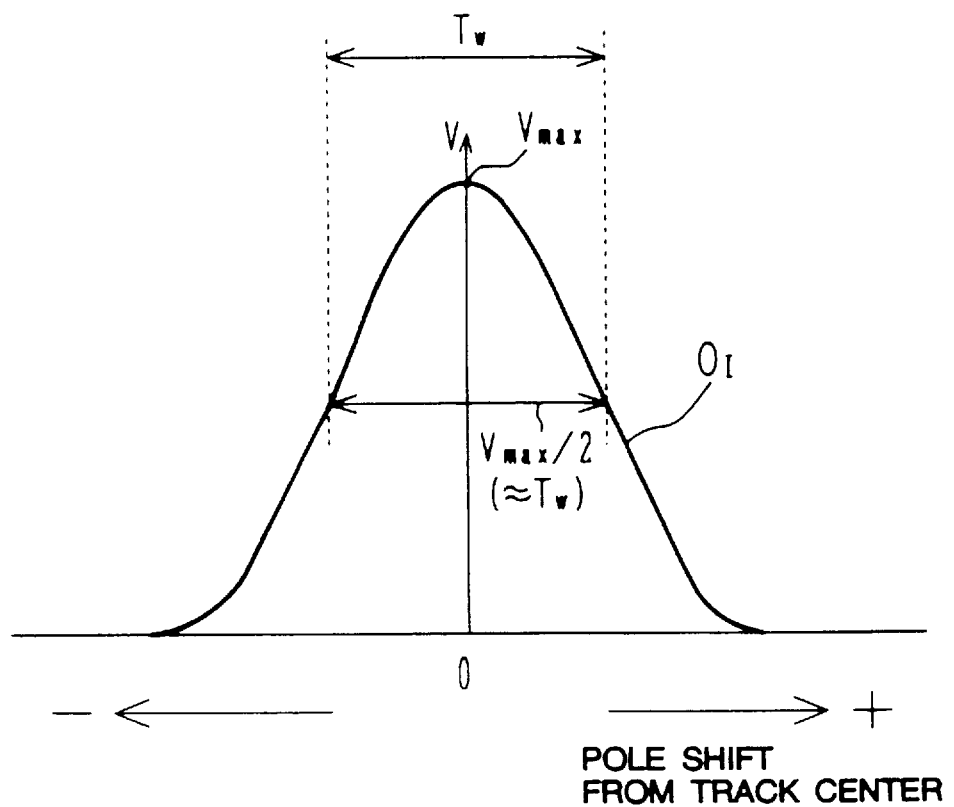
Figure 10:
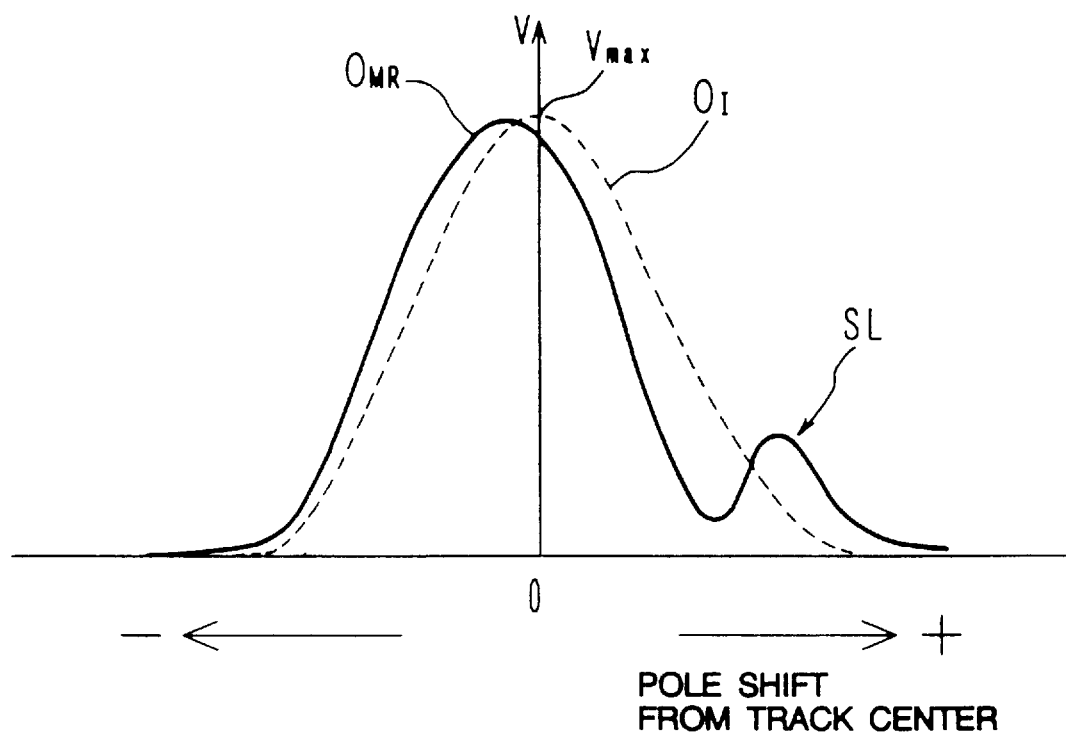
FIG. 10 is a graph showing the off-track characteristic of a conventional MR type magnetic head.
Figure 11A:
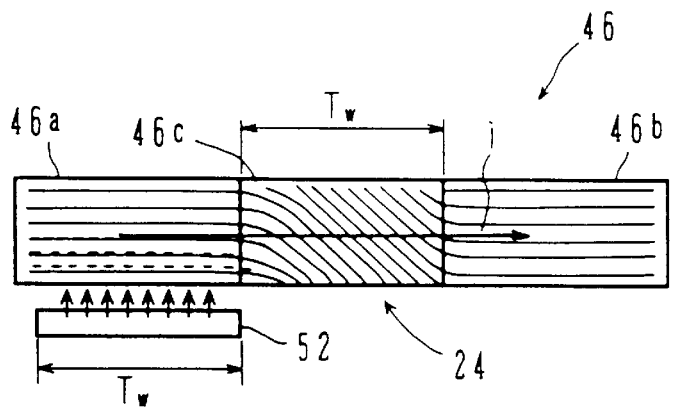
FIGS. 11A to 11E, and 11AA to 11EA illustrate the reason why a conventional MR type magnetic head has the off-track characteristic shown in FIG. 10, FIGS. 11A to 11E are schematic cross sectional views showing relative positions of a track written on a recording medium and an MR film, and FIGS. 11AA to 11EA are vector diagrams illustrating synthesis of reproduction output components.
Figure 11A:
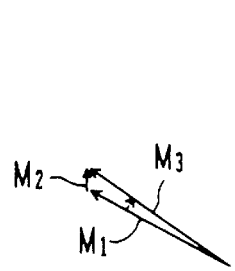
Figure 11B:
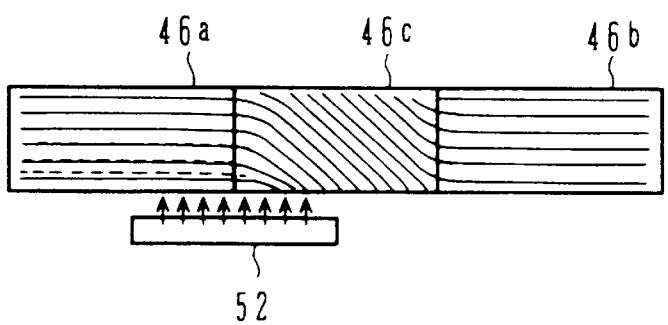
Figure 11B:
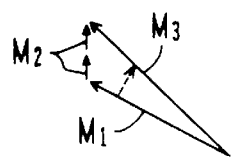
Figure 11C:
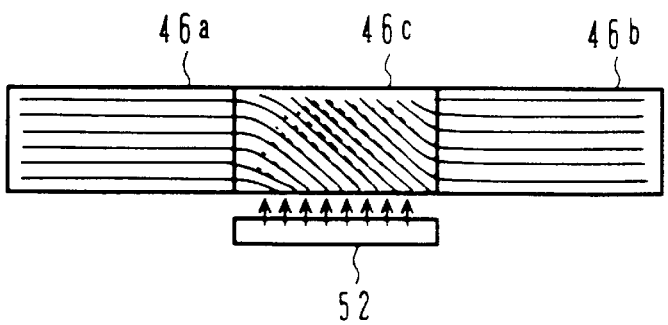
Figure 11C:
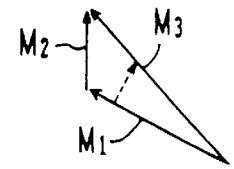
Figure 11D:
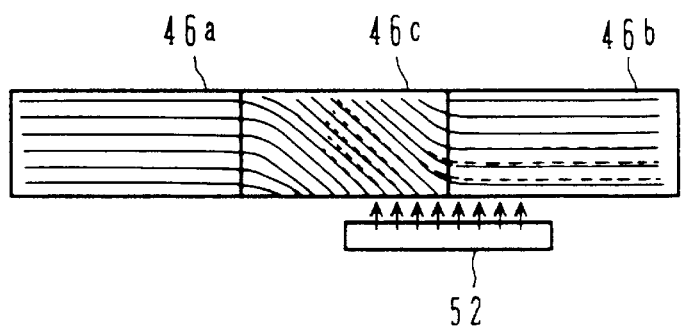
Figure 11D:
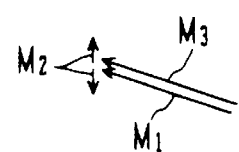
Figure 11E:
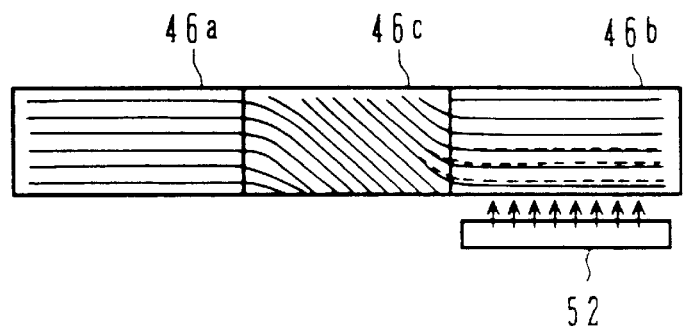
Figure 11E:
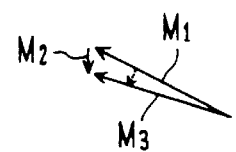

As shown in FIG. 3D, after the additional milling is performed for a predetermined time, the step d is removed and the perfect slanted surfaces 68 are formed on the whole side wall of the recess 67. After the slanted surfaces 68 are once formed, the bottom surface 70 gradually widens while maintaining a similar trapezoid cross section area. The whole surface milling is stopped when the width of the bottom surface 70 takes a desired width of the active region (i.e., track width Tw). A trapezoidal trench 66 is therefore completed.

In experiments, the recess 67 was vertically cut at the process illustrated in FIG. 2C until the surface of the magnet film 62 exposed. The whole surface milling process illustrated in FIG. 2D was performed for a time period of ⅓ to ⅕ the time period required for milling the whole thickness of the conductive film 64 and magnet film 62. Under the above conditions, all the slanted surfaces of a number of heads on a wafer had no step and the exposed lower gap layer 20 was less milled. The width of the bottom surface 70 was just the same width as the desired active region width (track width Tw).

As shown in FIG. 2E, after the trapezoidal trench 66 is formed, a sensor unit 28 is formed on the whole surface of the waver, the sensor unit 28 being a laminate of an MR film 46 (NiFe or other materials), a magnetic spacer layer 48 (Ti or other materials), and an SAL bias film 50 (soft magnetic film such as CoZrM where M is Nb, Mo, or other elements).

As shown in FIG. 2F, the sensor unit 28 is patterned to have a shape including a taper at its tip.

Figure 2G:
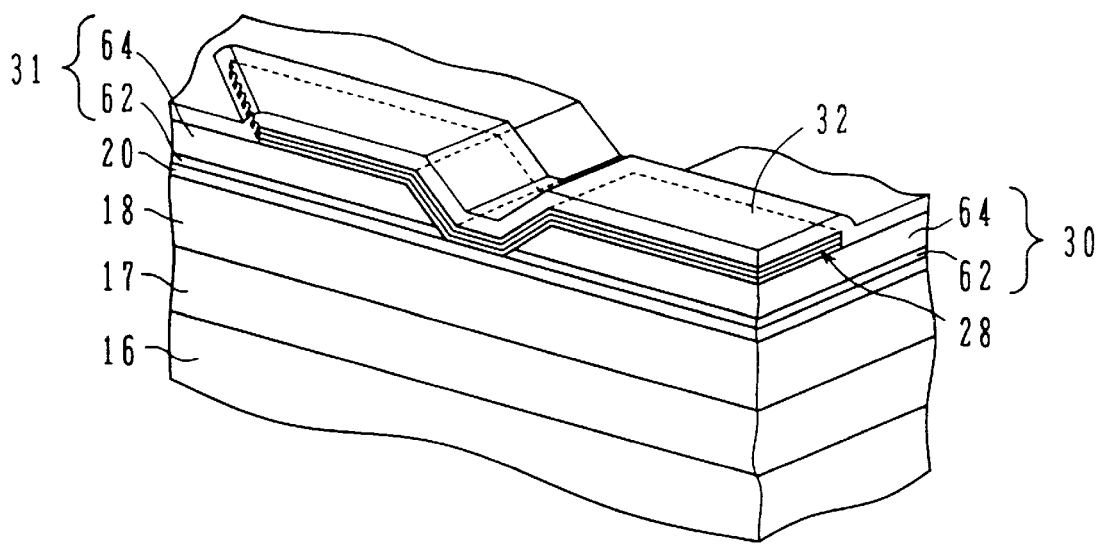

As shown in FIG. 2G, an inorganic insulating film of alumina is formed over the whole surface to form an upper gap layer 32 for the insulation between an upper shield layer 34 and the sensor unit 28 and for the shield gap between the upper shield layer 34 and leads 30 and 31.

Figure 2H:
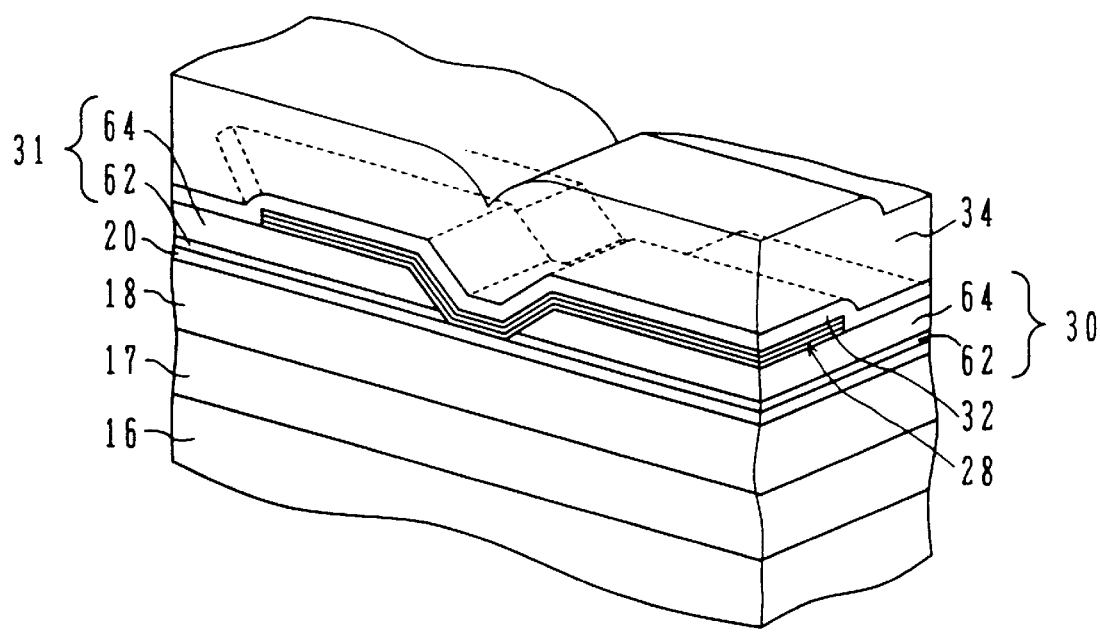

As shown in FIG. 2H, a soft magnetic film (NiFe, Sendust, or the like) is formed by vapor deposition, sputtering, or other processes to form the upper shield layer 34 which is also used as the lower core layer of the write head.

Figure 2I:
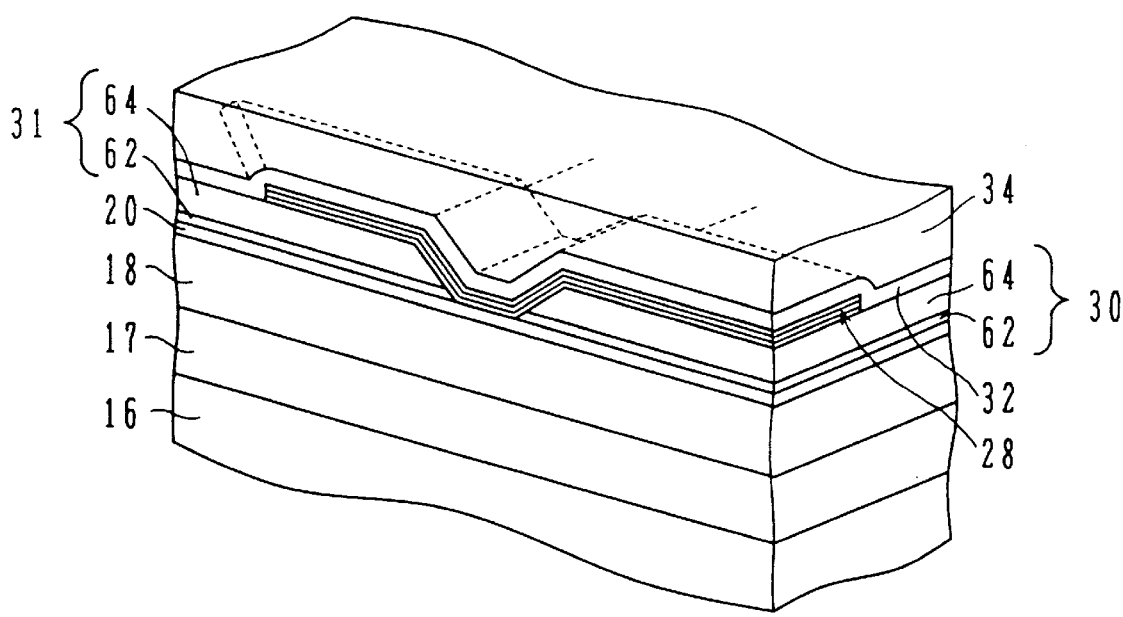

As shown in FIG. 2I, the surface of the upper shield layer—lower core 34 is mechanically lapped to make it flat.

Figure 2J:
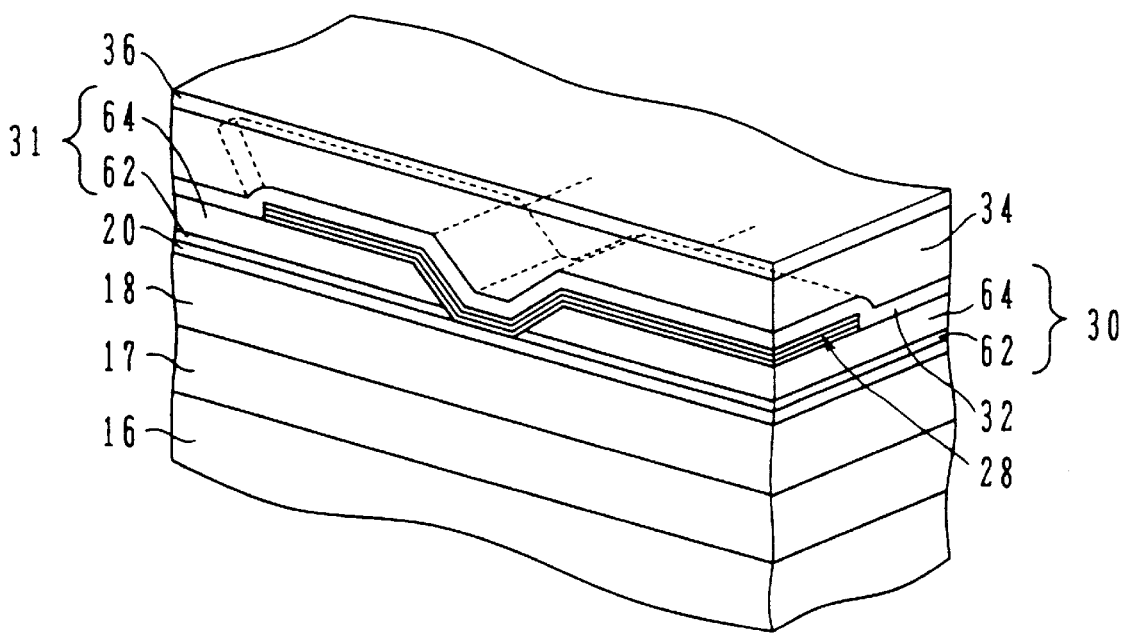

As shown in FIG. 2J, on the upper shield layer—lower core 34, a write gap layer 36 such as alumina is formed to form a write magnetic gap.

Figure 2K:
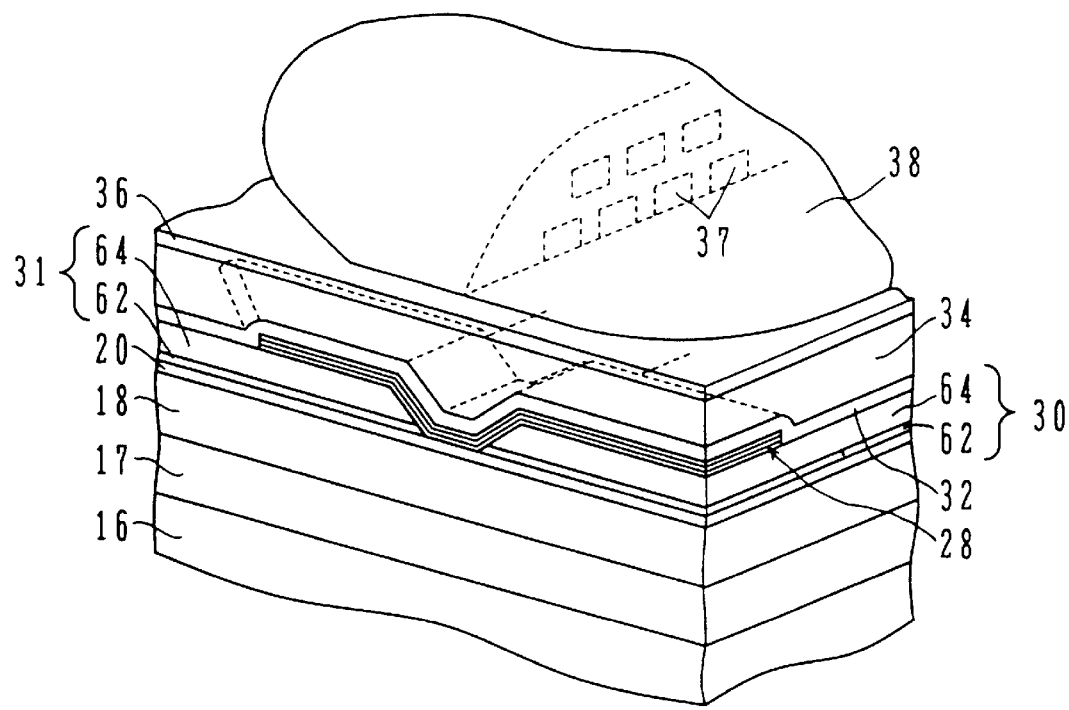

As shown in FIG. 2K, a coil 37 is formed and buried in an insulating layer 38.

Figure 2L:
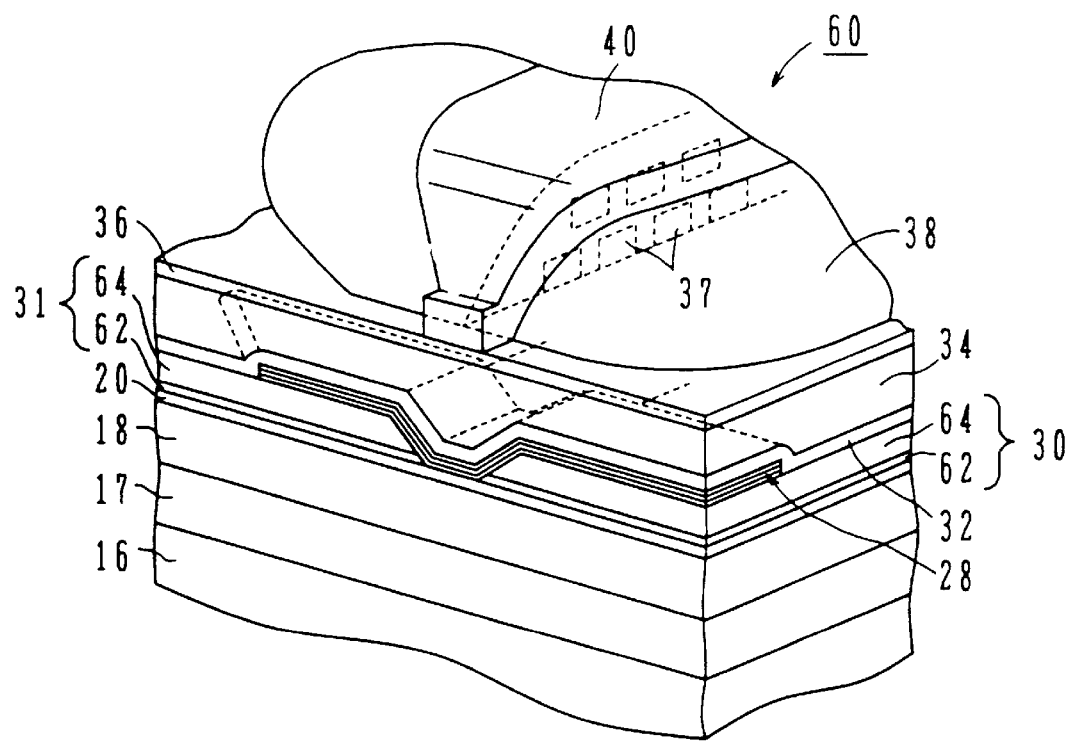

As shown in FIG. 2L, an upper core layer 40 is formed riding over the coil 37 and insulating layer 38, and patterned to form a write head (induction type magnetic head) 14. Lastly, a passivation film is coated to complete the composite magnetic head.

The induction-MR type thin film magnetic head 60 of FIGS. 1A and 1B constructed as above has the following advantageous effects.

(a) Part of the leads 30 and 31 made of a laminate of the conductive film 64 and magnet film 62 is etched to form a trench having the slanted regions, and the lower sharp edges of the patterned leads 30 and 31 determine the track width Tw which is equal to the distance between the lower sharp edges. Steps are formed at the bent portions of the slanted regions and at the opposite ends of the sensor unit 28 on the upper surfaces of the leads 30 and 31. The steps at the bent portions can be removed by the milling process. The steps at the opposite end portions of the sensor unit 28 scarcely degrade coverage so that the upper gap film 32 can be formed thin. The thinner the gap films 20 and 32, the smaller the effective gap g so that the reproduction resolution can be improved and high density recording and reproducing are possible.

(b) In place of the upper side lower shield sub-layer 18-2 in the structure shown in FIGS. 12A and 12B, the leads 30 and 31 can be formed. Because of the omission of the upper side lower shield sub-layer 18-2, the processes can be simplified.

(c) When the leads 30 and 31 are formed by the trapezoidal trench 66, both the track width Tw and the position of the magnet film 62 are determined. Therefore, the relative position between the leads 30 and 31 and the magnet film 62 (bias permanent magnet for forming a single magnetic domain) can be aligned with the opposite ends of the active region of the MR film with high precision. Accordingly, all MR magnetic heads on a wafer can have a good symmetrical track profile, and narrow track MR heads for high density data reading can be manufactured with a high yield.

(d) In the whole surface milling process illustrated in FIG. 2D (detailed in FIGS. 3A to 3D), a time required for which the slanted regions 68 reaches the surface of the lower gap layer is short (because the milling at a slanted surface is carried out at a rate about three times faster than at a flat surface). Once the slanted regions 68 reach the lower gap layer 20, the width of the bottom surface 70 increases slowly while maintaining an analog trapezoid cross section area. Therefore, the width of the trapezoidal trench 66 can be finely adjusted by an additional whole surface milling process.

Regarding the conventional method of depositing a hard magnetic bias layer on a slanted surface of a magnetoresistive layer using lift-off as described before, the present inventors have found following problems.

When the hard magnetic bias layer is sputtered on the tri-layer using a resist pattern as a mask, a small amount of chemical agent, moisture, etc. is released from the resist pattern, to degrade the magnetic properties of the hard magnetic bias layer. For ensuring the succeeding lift-off step, the resist pattern should be formed thick. This also increases the gas release from the resist pattern.

It is important that the hard magnetic bias layer should be formed to have [1 1 1] orientation. When a minute amount of moisture, etc. exists in the depositing atmosphere, the crystal orientation of the sputtered film is likely to be disturbed. In particular, at the portion where the hard magnetic bias layer is abutting to the magnetoresistive layer, the crystal orientation is likely to be largely disturbed. Then, the field strength in the hard magnetic bias layer becomes decreases at the portion where the crystal orientation is largely disturbed. Then, even if a bias magnetic field of sufficient strength is generated at positions remote from the magnetoresistive film, the field strength becomes gradually weaker as the position approaches to the magnetoresistive film. Then, the strength of the bias magnetic field is weak at the portion where the hard magnetic bias layer and the magnetoresistive layer are abutting. It becomes difficult to stably produce a single magnetic domain in the magnetoresistive layer.

Now, another embodiment will be described referring to FIG. 15A to 15E.

Figure 15A:
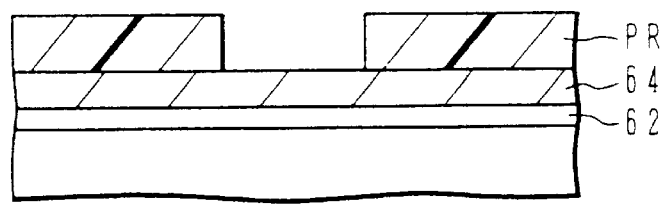

In FIG. 15A, a hard magnetic film 62 for establishing a longitudinal bias magnetic field and a non-magnetic and electrically conductive film 64 for forming lead conductors are formed on a flat underlying surface. A photo-resist film is coated on the conductive film 64 and patterned to form a resist pattern PR.

Here, since the hard magnetic film 62 is formed on a flat underlying surface, it is easy to realize [1 1 1] crystal orientation. Further, when the hard magnetic film 62 is formed by sputtering, etc., the deposition can be done in a clean atmosphere in which no composition of resist, nor moisture exists. Therefore, crystal orientation of the hard magnetic film 62 is prevented from being disturbed. Once a hard magnetic film 62 is formed with a stable [1 1 1] orientation, the crystal orientation will not be disturbed thereafter even if it is exposed to moisture, etc. The hard magnetic film may be made of CoCrTa, CoCrPt, CoPt, etc. The conductive film may be made of W or Ta. Since the resist layer is formed on the flat conductive film 64 which is formed on the flat hard magnetic film 62, it may be made thin. Therefore, the patterning accuracy may be improved to improve the production yield. Other respects are the same or similar to those described in connection with FIGS. 2A to 2C.

Figure 15B:
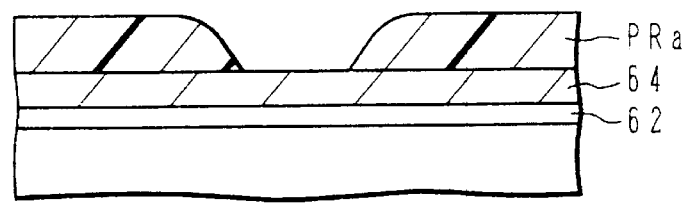

As shown in FIG. 15B, the resist pattern is reflowed to have a tapered edge. The reflowed resist pattern PRa has slanted side surfaces.

Figure 15C:
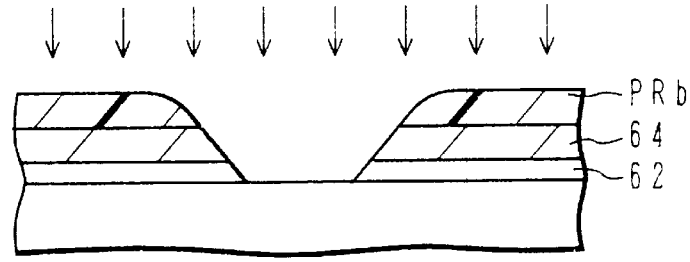

As shown in FIG. 15C, the substrate is subjected to ion milling using the resist pattern PRa as a mask. As the ion milling proceeds, the edge of the resist pattern PRb is retarded to produce slanted side surfaces of the laminate formed of the hard magnetic film 62 and the conductive film 64. When the underlying surface is exposed, the laminate is separated into two parts. After the ion milling, the resist pattern PRb is removed.

Figure 15D:
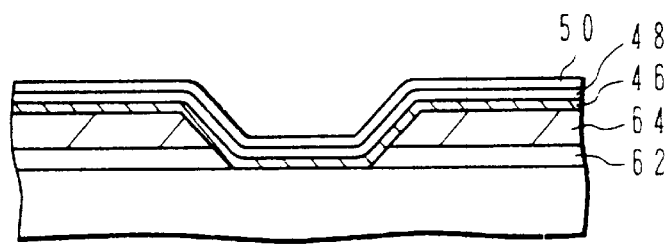
Figure 15E:
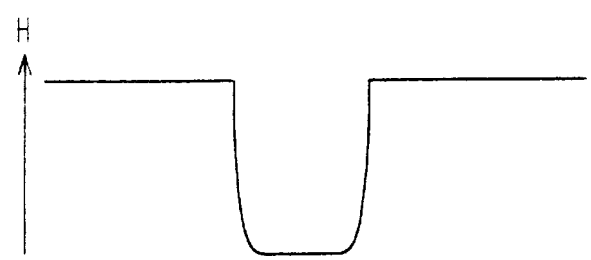

As shown in FIG. 15D, a magnetoresistive film 46, a magnetic spacer layer 48 and an SAL bias film 50 are deposited in this order to form a laminate of three layers. The magnetoresistive layer 46 is formed to cover the top flat surfaces of the two parts of the conductive film 64 and the recessed surface portion of inverted (upside-down) trapezoidal cross-section. The inverted trapezoidal cross-sectional shape is formed of the flat bottom surface which is the top surface of the underlying layer, and slanted side surfaces which are the side surfaces of the two parts of the hard magnetic film 62 and the non-magnetic conductive film 64. Since the conductive film 64 is non-magnetic, it is not magnetically coupled with the magnetoresistive layer 46. The hard magnetic film 62 is exposed only at the slanted side surfaces, and is magnetically coupled with the magnetoresistive layer thereat. As a result, the field strength of the longitudinal field abruptly decreases at the slanted portion of the hard magnetic film. Therefore, it becomes easy to establish a strong longitudinal field in the magnetoresistive film at the bottom portion.

Then, processes similar to those described in connection with FIGS. 2F to 2L are carried out to produce a composite thin film magnetic head.

Another embodiment of the invention is illustrated in FIG. 4. The leads 30 and 31 have a two-layer laminate structure with a lower conductive film 64 and an upper magnet film 62. The processes of manufacturing the induction-MR type composite magnetic head 72 shown in FIG. 4 are illustrated in FIGS. 5A to 5L which generally correspond to FIGS. 2A to 2L. In the lead film forming process illustrated in FIG. 5B, W or Ta is deposited to 1500 to 4500 angstroms to form the conductive film 64, and CoCrTa is deposited 100 to 1000 angstroms on the conductive film 64 to form the magnet film 62. In the vertical milling process illustrated in FIG. 5C, trenching continues until the conductive film 64 is left a little. The whole surface milling process illustrated in FIG. 5D was performed for a time period of ⅓ to ⅕ the time period required for completely removing the magnet film 62 and conductive film 64, and the perfect slanted surfaces 68 were formed exposing the lower gap layer 20 at the bottom surface 70 of the trench 66. The other processes shown in FIG. 5E to 5L are similar to the first embodiment. In this embodiment, the similar advantages of the first embodiment can be obtained.

A still further embodiment of the invention is illustrated in FIG. 6. The leads 30 and 31 have a three-layer laminate structure with a lower first magnet film 62-1, a middle conductive film 64, and an upper second magnet film 62-2. The processes of manufacturing the induction-MR type composite magnetic head 74 shown in FIG. 6 are illustrated in FIGS. 7A to 7L which generally correspond to FIGS. 2A to 2L. In the lead film forming process illustrated in FIG. 7B, first CoCrTa is deposited 100 to 1000 angstroms to form the first magnet film 62-1, then W or Ta is deposited to 2500 to 4000 angstroms to form the conductive film 64, and CoCrTa is deposited 100 to 1000 angstroms on the conductive film 64 to form the second magnet film 62-2. In the vertical milling process illustrated in FIG. 7C, trenching continues until the surface of the first magnet film 62-1 exposes. The whole surface milling process illustrated in FIG. 7D was performed for a time period of ⅓ to ⅕ the time period required for completely removing the second magnet film 62-2 and conductive film 64, and the perfect slanted surfaces 68 were formed exposing the lower gap layer 20 at the bottom surface 70 of the trench 66. The other processes are similar to the first embodiment. In this embodiment, the similar advantages of the first embodiment can be obtained.

The leads may have a three-layer structure of a conductive film, a magnet film, and a conductive film in this order, or other laminated structures. The structure of the sensor unit is not limited to the above embodiments. In each embodiment, although the leads are made of a laminate of magnet film and conductive film, the leads may be formed only by a magnet film. For example, the magnet film 62 and conductive film 64 shown in FIGS. 1A and 1B is replaced by a magnetic conductive film of the same material. This invention is also applicable to MR heads other than the SAL bias type, and to MR heads for disks other than a hard disk.

The present invention has been described in connection with the preferred embodiments. The invention is not limited only to the above embodiments. It is apparent to those skilled in the art that various modifications, improvements, combinations and the like can be made without departing from the scope of the appended claims.

We claim:

1. A magneto-resistance magnetic head comprising:
   (a) a base;
   (b) a longitudinal bias portion, formed on the base and comprising a pair of longitudinal bias films, each having a respective first upper flat surface and a respective first slanted surface, for generating a longitudinal bias magnetic field;
   (c) a lead portion comprising first and second leads laminated directly on the longitudinal bias films so as to cover the respective first upper flat surfaces and to expose the respective first slanted surfaces of the longitudinal bias films, wherein the lead portion is made of non-magnetic material, and each lead has a second upper flat surface and a second slanted surface;
   (d) a magneto-resistance material layer formed over the longitudinal bias portion and the lead portion, wherein the magneto-resistance material layer directly contacts the respective upper surfaces of the leads and magnetically couples with the exposed longitudinal bias portion through the respective first slanted surfaces of the longitudinal bias films;
   (e) a first spacer layer formed on the magneto-resistance material layer; and
   (f) a transverse bias layer formed on the first spacer layer.

2. A magneto-resistance magnetic head according to claim 1, wherein the longitudinal bias portion comprises a material selected from a group consisting of CoCrTa, CoCrPt and CoPt.

3. A magneto-resistance magnetic head according to claim 1, wherein the lead portion comprises a material selected from a group consisting of W and Ta.

4. A magneto-resistance magnetic head according to claim 1, further comprising:
   (a-1) a magnetic shield layer on the base.

5. A magneto-resistance magnetic head according to claim 1, wherein the first spacer layer is made of Ti.

6. A magneto-resistance magnetic head according to claim 1, wherein the transverse bias layer comprises a soft magnetic material selected from a group consisting of CoZrNb, CoZrMo, NiFeRf and NiFeZr.

7. A magneto-resistance magnetic head according to claim 1, wherein the slanted surfaces of the first and second leads and the first and second longitudinal bias films define an inverted trapezoidal shape.

8. A magneto-resistance magnetic head according to claim 1, wherein the base has a planar surface and the longitudinal bias portion is formed on the planar surface.

9. A magneto-resistance magnetic head according to claim 1, wherein the longitudinal bias portion has [1 1 1] crystalline orientation.

* * * * *